United States Patent
Kim et al.

(10) Patent No.: US 12,277,287 B2
(45) Date of Patent: Apr. 15, 2025

(54) ELECTRONIC DEVICE INCLUDING FLEXIBLE DISPLAY AND CONTROLLING DISPLAY OF A GRAPHIC USER INTERFACE BASED ON SENSED STRESS VALUES CAUSED BY A TOUCH ON THE FLEXIBLE DISPLAY

(71) Applicant: SAMSUNG ELECTRONICS CO., LTD., Suwon-si (KR)

(72) Inventors: Moonsun Kim, Suwon-si (KR); Myunghoon Kwak, Suwon-si (KR); Bohyeon Kim, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/518,648

(22) Filed: Nov. 4, 2021

(65) Prior Publication Data

US 2022/0147178 A1     May 12, 2022

Related U.S. Application Data

(63) Continuation of application No. PCT/KR2021/015341, filed on Oct. 28, 2021.

(30) Foreign Application Priority Data

Nov. 6, 2020 (KR) .................. 10-2020-0148045
Dec. 24, 2020 (KR) .................. 10-2020-0183244

(51) Int. Cl.
G06F 3/041 (2006.01)
G06F 3/0488 (2022.01)

(52) U.S. Cl.
CPC .......... *G06F 3/0418* (2013.01); *G06F 3/0412* (2013.01); *G06F 3/0488* (2013.01); *G06F 2203/04105* (2013.01)

(58) Field of Classification Search
CPC .... G06F 3/0418; G06F 3/0412; G06F 3/0488; G06F 2203/04105; G06F 1/1624;
(Continued)

(56) References Cited

U.S. PATENT DOCUMENTS 9,047,011 B2   6/2015   Lee
9,970,143 B2   5/2018   Cheon et al.
(Continued)

FOREIGN PATENT DOCUMENTS

EP    1970886 A1 * 9/2008 ....... G02F 1/133305
KR   10-2009-0022037    3/2009
(Continued)

OTHER PUBLICATIONS

Search Report issued Feb. 21, 2022 in counterpart International Patent Application No. PCT/KR2021/015341.

*Primary Examiner* — David D Davis
(74) *Attorney, Agent, or Firm* — Nixon & Vanderhye P.C.

(57) ABSTRACT

An electronic device may include a display, a touch circuit, and a processor. The display may include an area visually exposed to an outside of the electronic device is capable of being changed between a first state and a second state. When an identified first stress value of a first unit area, among a plurality of unit areas, is greater than a first threshold value, based on a graphic user interface to be displayed, the display may be controlled to display a graphic user interface in a first area including the first unit area in a second area excluding the first unit area, to reduce pressure to the first unit area.

20 Claims, 20 Drawing Sheets

(58) Field of Classification Search
CPC .... G06F 1/1652; G06F 3/0446; G06F 3/0416;
G06F 2203/04102
See application file for complete search history.

(56) References Cited

U.S. PATENT DOCUMENTS

| | | | |
|---|---|---|---|
| 10,000,879 | B2 | 6/2018 | Kwon et al. |
| 10,047,473 | B2 | 8/2018 | Kwon et al. |
| 10,235,037 | B2 | 3/2019 | Kim et al. |
| 10,331,872 | B2 | 6/2019 | Hsu |
| 10,488,957 | B2 * | 11/2019 | Kim ................ G06F 3/041 |
| 10,815,602 | B2 | 10/2020 | Kwon et al. |
| 11,366,584 | B2 * | 6/2022 | Chung ............ G06F 3/04883 |
| 2010/0167791 | A1 * | 7/2010 | Lim ................ H04M 1/0266 455/566 |
| 2017/0039360 | A1 | 2/2017 | Hsu |
| 2017/0121890 | A1 | 5/2017 | Kwon et al. |
| 2017/0351351 | A1 | 12/2017 | Kim et al. |
| 2019/0227703 | A1 * | 7/2019 | Lee ................ G06F 3/0482 |
| 2019/0261519 | A1 * | 8/2019 | Park .............. G06F 3/04886 |
| 2020/0170128 | A1 * | 5/2020 | Kim .................. E05D 3/18 |
| 2020/0209923 | A1 * | 7/2020 | Ahn ............... G06F 3/04883 |
| 2021/0034210 | A1 * | 2/2021 | Chung ............ G06F 3/04883 |
| 2021/0064207 | A1 | 3/2021 | Kim et al. |

FOREIGN PATENT DOCUMENTS

| | | | |
|---|---|---|---|
| KR | 2012-0136949 | 12/2012 | |
| KR | 2014-0010316 | 1/2014 | |
| KR | 20140010316 A * | 1/2014 | ......... G06F 3/04886 |
| KR | 2017-0100485 | 9/2017 | |
| KR | 2018-0042564 | 4/2018 | |
| KR | 2019-0098340 | 8/2019 | |
| KR | 20190098340 A * | 8/2019 | ........ H04M 1/72519 |
| KR | 2019-0111623 | 10/2019 | |
| KR | 102262962 B1 * | 6/2021 | ........ H04M 1/72448 |

* cited by examiner

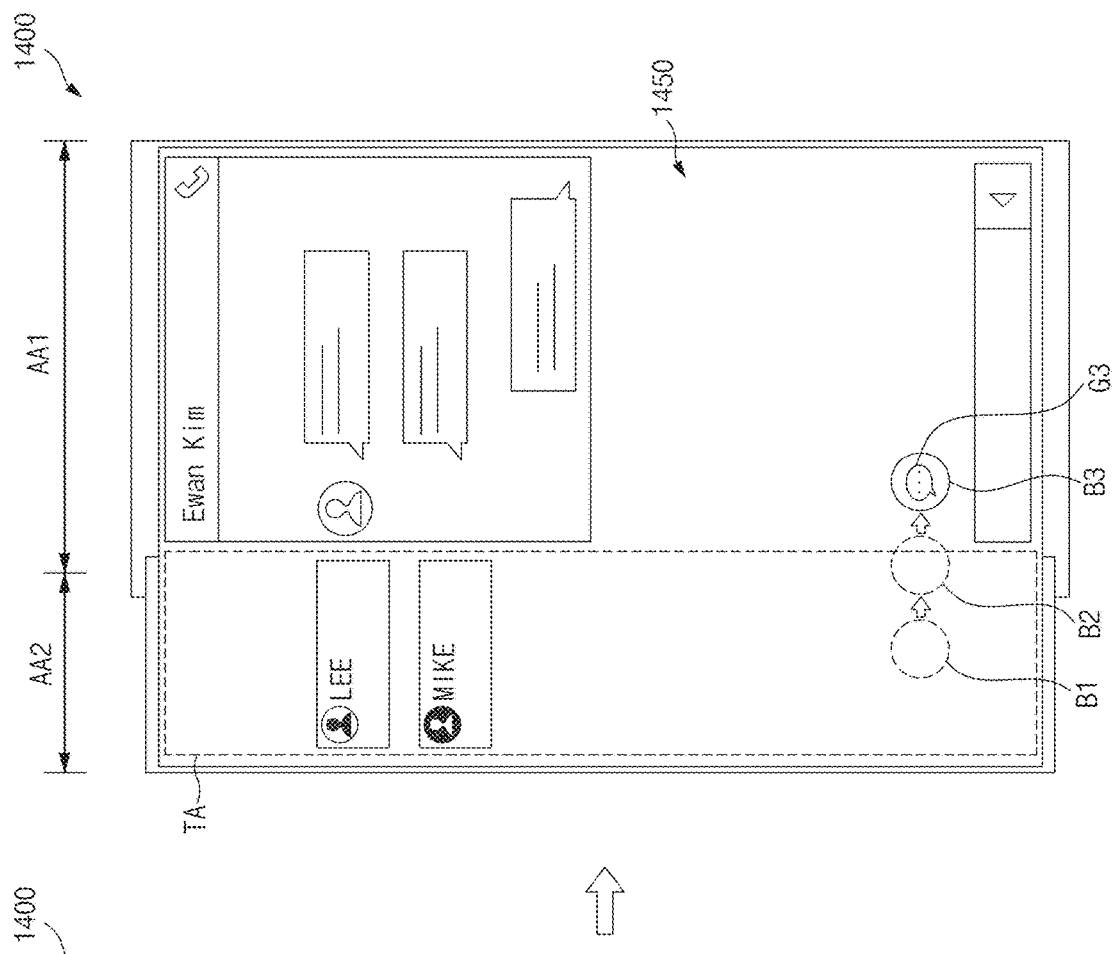
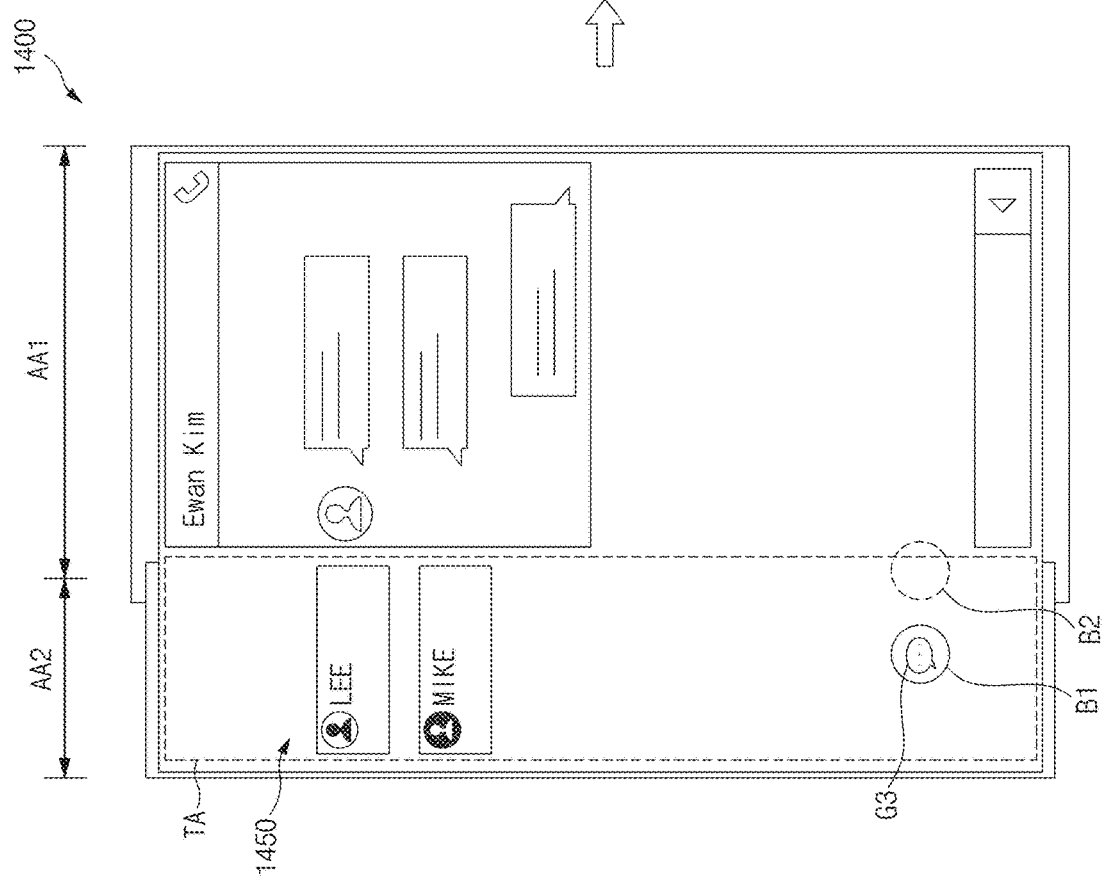
FIG. 14

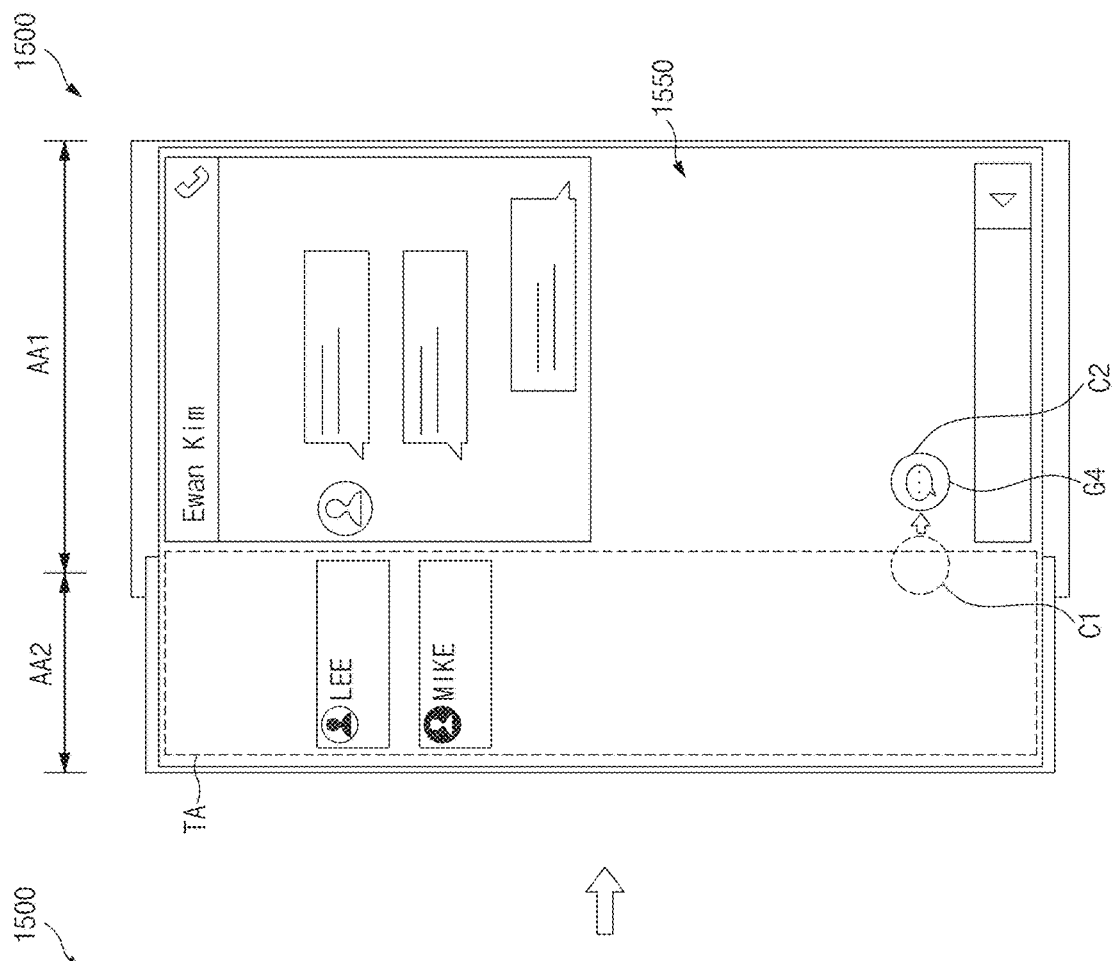
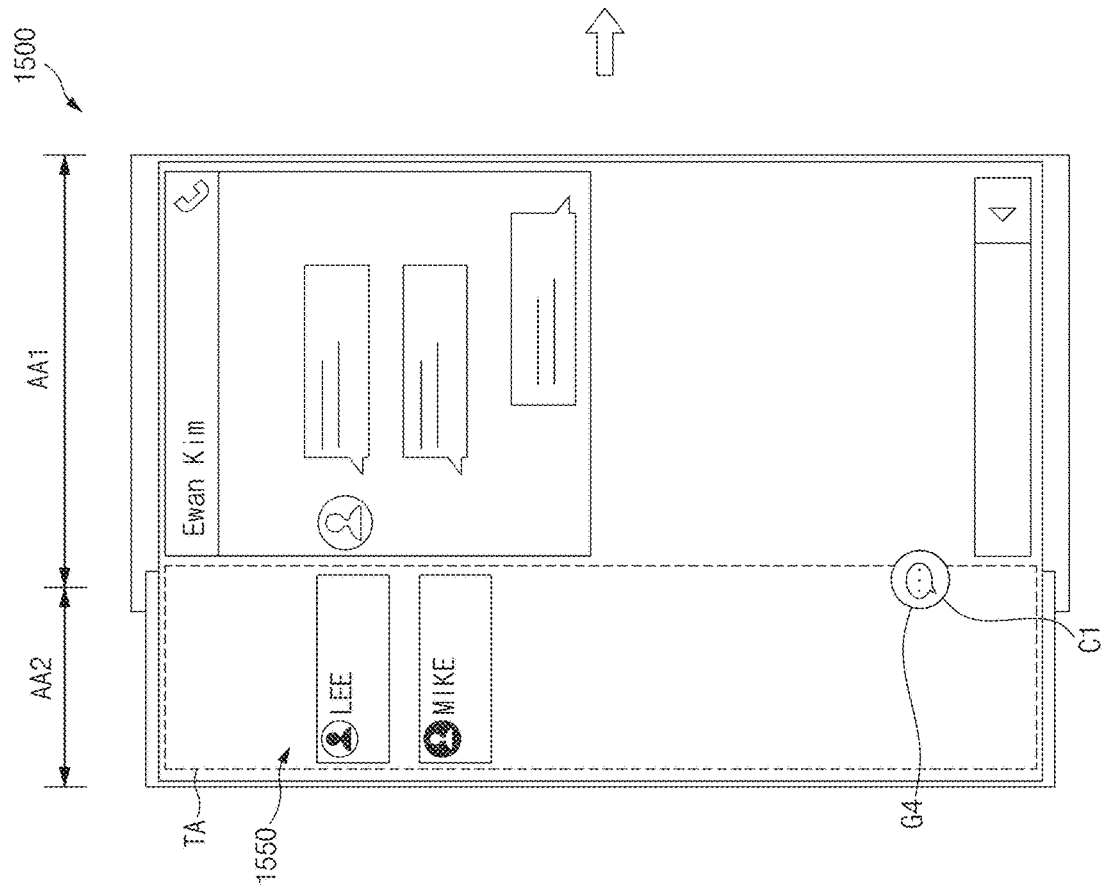
FIG. 15

ELECTRONIC DEVICE INCLUDING FLEXIBLE DISPLAY AND CONTROLLING DISPLAY OF A GRAPHIC USER INTERFACE BASED ON SENSED STRESS VALUES CAUSED BY A TOUCH ON THE FLEXIBLE DISPLAY

CROSS-REFERENCE TO RELATED APPLICATIONS

This application is a continuation of International Application No. PCT/KR2021/015341 designating the United States, filed on Oct. 28, 2021, in the Korean Intellectual Property Receiving Office and claiming priority to Korean Patent Application No. 10-2020-0148045, filed on Nov. 6, 2020, in the Korean Intellectual Property Office and Korean Patent Application No. 10-2020-0183244, filed on Dec. 24, 2020, in the Korean Intellectual Property Office, the disclosures of all of which are incorporated by reference herein in their entireties.

BACKGROUND

Field

The disclosure relates to an electronic device including a flexible display.

Description of Related Art

An electronic device may display a screen through a display. The display included in the electronic device may be a flexible display. For example, the flexible display may be disposed in the electronic device such that at least a portion thereof is curved, foldable, or rollable in shape. A display area of the display, which is visually exposed to the outside, may be extended or reduced depending on a state of the electronic device.

Meanwhile, the electronic device may sense a touch input according to a contact of an external object and may perform a specified operation based on the touch input.

SUMMARY

Embodiments of the disclosure provide an electronic device capable of preventing and/or reducing the quality of a display from being degraded due to accumulation of pressure applied to an area of the display by allowing a touch input not to be focused on the area thereof.

Embodiments of the disclosure provide an electronic device capable of decreasing touch pressure applied to an area of the display, in which a lot of touch inputs are made.

An electronic device according to an example embodiment may include: a display including a target area divided into a plurality of unit areas wherein a size of an area visually exposed to the outside of the electronic device is changed, a touch circuit configured to sense a touch of an object, and a processor operatively connected with the display and the touch circuit, and the processor may be configured to: control the display to display a graphic user interface in a first area of the target area, calculate stress values respectively corresponding to the plurality of unit areas of the target area based on the touch of the object being sensed, and may change a position of the graphic user interface to a second area different from the first area based on the stress value of at least one unit area of the first area being greater than a first threshold value.

An electronic device according to an example embodiment may include: a display including a target area divided into a plurality of unit areas wherein a size of an area visually exposed to the outside of the electronic device is changed, a touch circuit configured to sense a touch of an object, and a processor operatively connected with the display and the touch circuit, and the processor may be configured to: calculate stress values respectively corresponding to the plurality of unit areas of the target area based on the touch of the object being sensed, and may change a touch sensing parameter of a unit area having stress value greater than a first threshold value, from among the plurality of unit areas.

According to various example embodiments, an electronic device may prevent and/or reduce the quality of a display from being degraded due to accumulation of pressure applied to one area of the display by allowing a touch input to not be focused on the area thereof.

According to various example embodiments, the electronic device may decrease pressure applied to the display when a touch is made, with regard to an area in which a lot of touch inputs are made.

Besides, a variety of effects directly or indirectly understood through this disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 14 is a diagram illustrating example movement of a graphic user interface in a second state of an electronic device according to an embodiment.

FIG. 15 is a diagram illustrating example movement of a graphic user interface in a second state of an electronic device according to an embodiment.

With regard to description of drawings, the same or similar components will be marked by the same or similar reference signs.

DETAILED DESCRIPTION

Hereinafter, various example embodiments of the disclosure will be described with reference to accompanying drawings. However, those of ordinary skill in the art will recognize that various modifications, equivalents, and/or alternatives on the various example embodiments described herein can be variously made without departing from the full scope and spirit of the disclosure.

Figure 1:
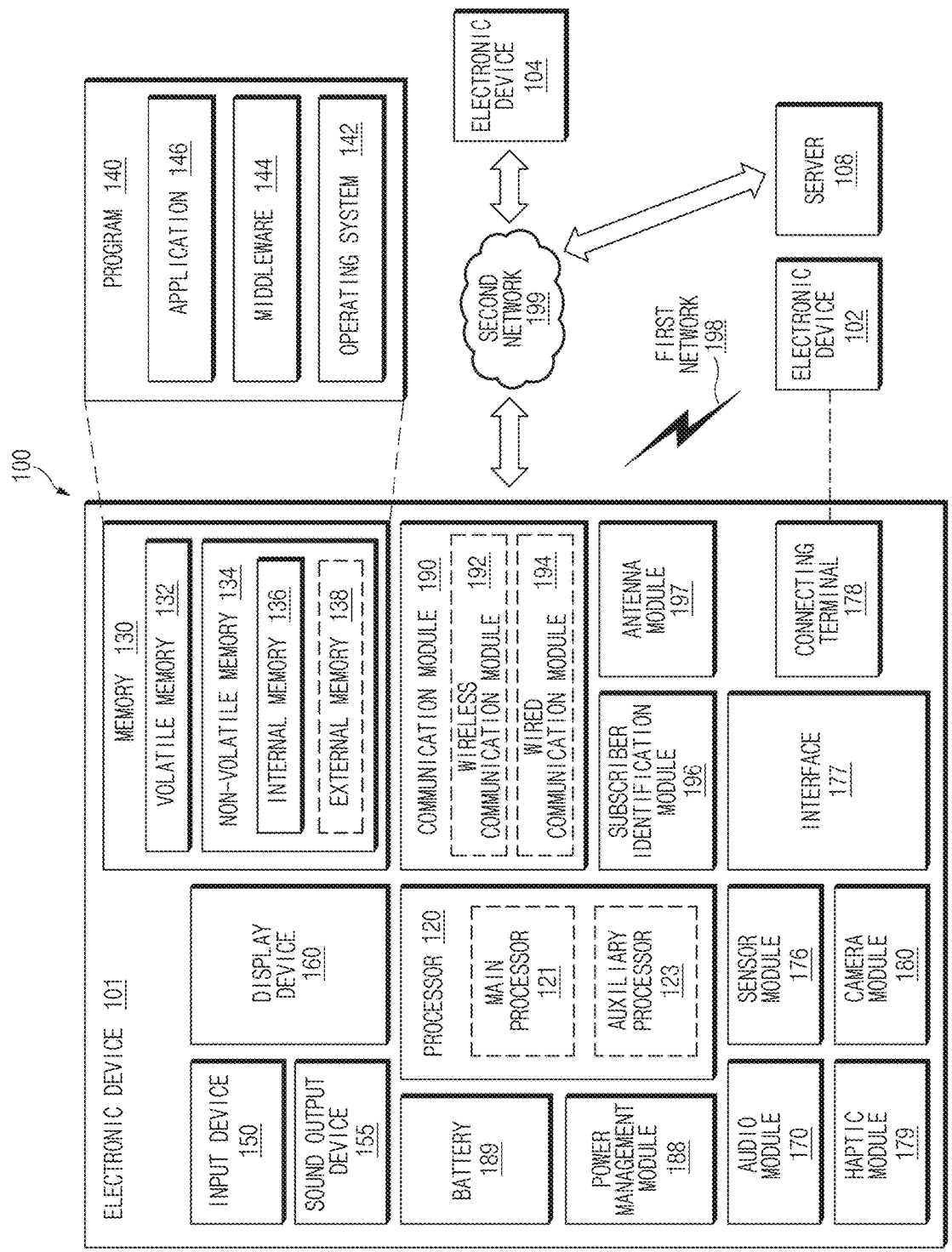
FIG. 1 is a block diagram illustrating an example electronic device in a network environment.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
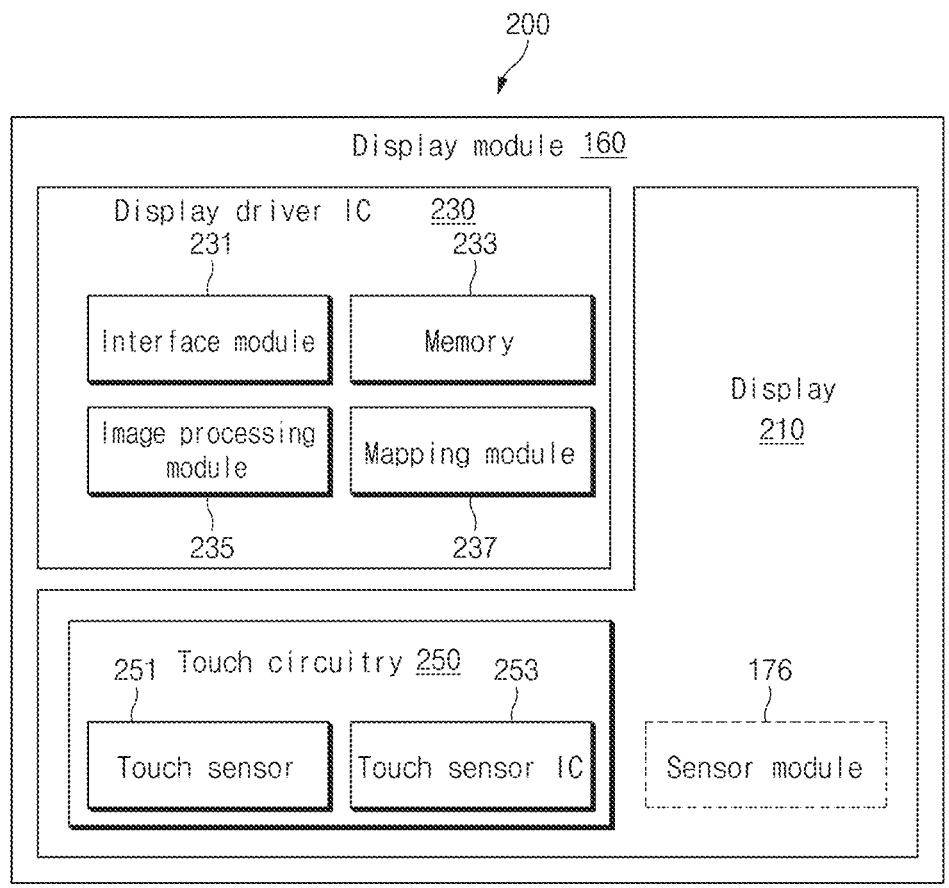
FIG. 2 is a block diagram illustrating an example configuration of a display module.

FIG. 2 is a block diagram 200 illustrating an example configuration of the display module 160 according to various embodiments. Referring to FIG. 2, the display module 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
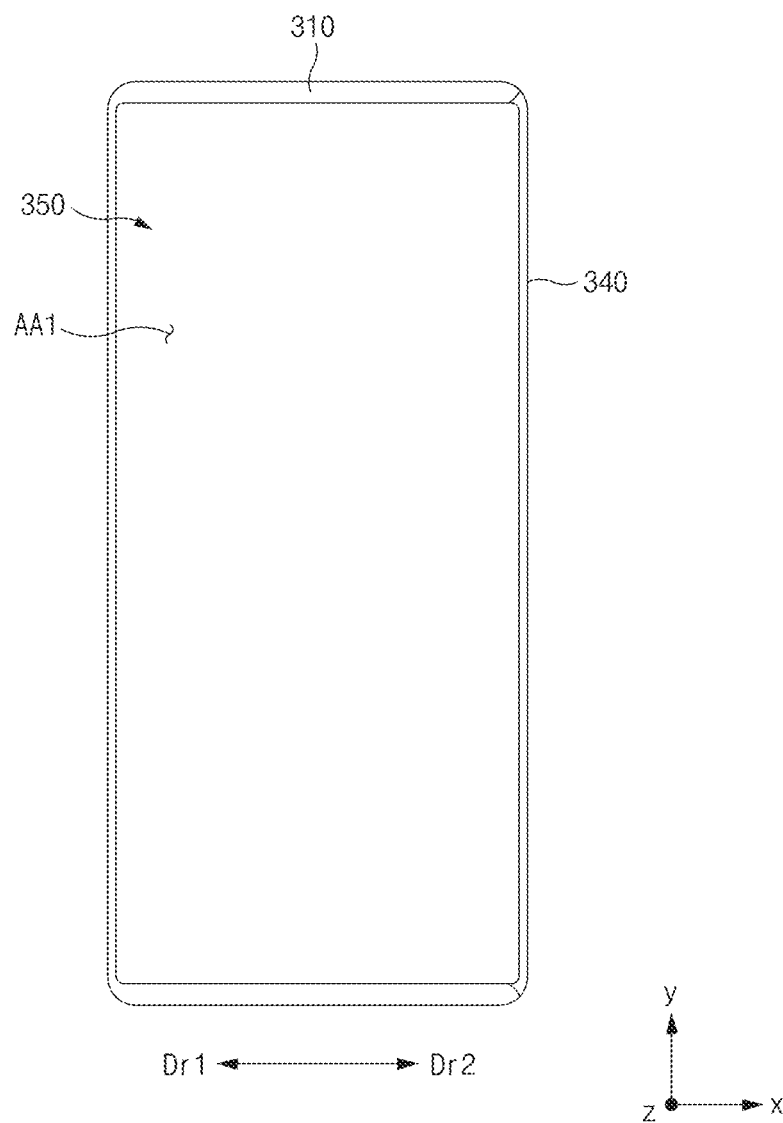
FIG. 3 is a diagram illustrating a first state of an electronic device according to an embodiment.
Figure 4:
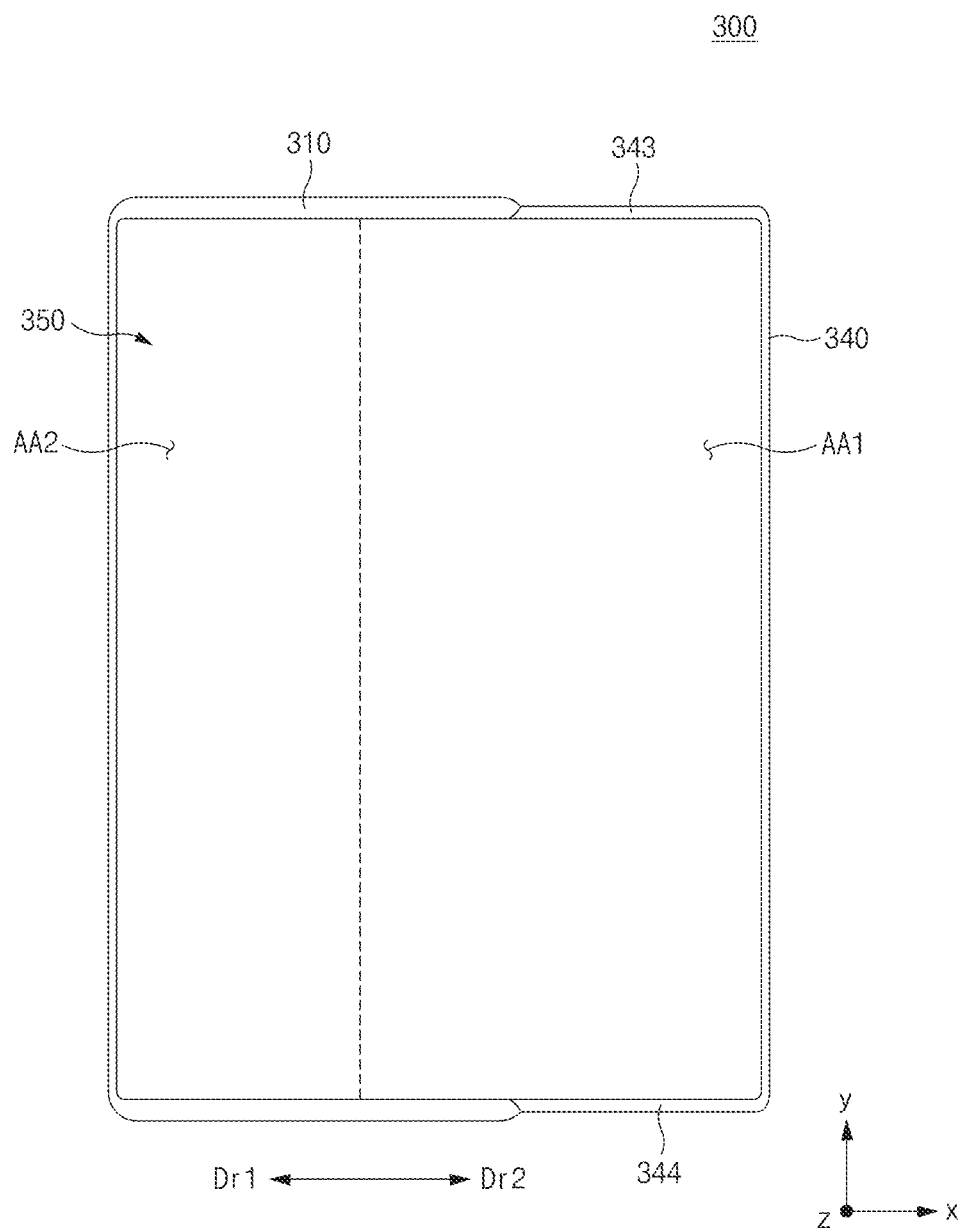
FIG. 4 is a diagram illustrating a second state of an electronic device according to an embodiment.

FIG. 3 is a diagram illustrating a first state of an electronic device according to an embodiment. FIG. 4 is a diagram illustrating a second state of an electronic device according to an embodiment.

Referring to FIGS. 3 and 4, an electronic device 300 may include a first structure 310, a second structure 340, and a display 350.

In an embodiment, the electronic device 300 may be an electronic device of a slidable type or a rollable type. The electronic device 300 may include a first state (e.g., a closed state or a reduction mode) and a second state (e.g., an opened state or an expansion mode). The first state and the second state may be determined depending on a position of the second structure 340 relative to the first structure 310. The electronic device 300 may be changed (or switched) between the first state and the second state by a user operation or a mechanical operation.

In an embodiment, the first state may refer to a state in which the area (or size) of the display 350 that is visually exposed on a front surface of the electronic device 300 is relatively reduced. The second state may refer to a state in which the area (or size) of the display 350 that is visually exposed on the front surface of the electronic device 300 is relatively expanded. For example, the second state may refer to a state in which the area (or size) of the display 350 visually exposed on the front surface of the electronic device 300 is larger than that in the first state. Also, the first state may refer to a closed state in which a portion of the second structure 340 (e.g., sidewall portions 343 and 344 facing a y-axis direction) is located inward (or outward) of the first structure 310 such that the second structure 340 is closed to the first structure 310. The second state may refer to an opened state in which the portions 343 and 344 of the second structure 340 move out of the first structure 310 such that the second structure 340 is open to the first structure 310. In an embodiment, the electronic device 300 may further include an intermediate state between the first state and the second state. For example, the intermediate state may refer to a state in which the area of the display 350 visually exposed on the front surface of the electronic device 300 is larger than that of the first state and the area of the display 350 visually exposed on the front surface of the electronic device 300 is smaller than that of the second state.

In an embodiment, the first structure (e.g., first housing) 310 and the second structure (e.g., second housing) 340 may be coupled so as to be slidable relative to each other. The second structure 340 may be slidably coupled to one side of the first structure 310. For example, the first structure 310 may be a fixed structure, and the second structure 340 may be a structure movable relative to the first structure 310. The second structure 340 may be coupled to the one side of the first structure 310 so as to be slidable relative to the first structure 310 in opposite directions (e.g., +x/−x-axis directions).

In an embodiment, as the second structure 340 slides relative to the first structure 310, the electronic device 300 may be changed (or switched) between the first state and the second state. For example, the electronic device 300 may be changed to the second state (e.g., the state of FIG. 4) as the second structure 340 moves in a second direction Dr2 relative to the first structure 310 in the first state (e.g., the state of FIG. 3). In contrast, the electronic device 300 may be changed to the first state as the second structure 340 moves in a first direction Dr1 relative to the first structure 310 in the second state.

In an embodiment, the size (or area) of an area of the display 350, which is visually exposed on the front side of the electronic device 300, may be changed in response to a sliding motion of the second structure 340. The display 350 may be configured such that the exposed area thereof is expanded or reduced depending on the sliding motion of the second structure 340 in a state where the display 350 is supported by at least one of the first structure 310 and the second structure 340. The display 350 may at least partially include a flexible portion.

In an embodiment, the display 350 may include a default area AA1 and an expansion area AA2 extending from the default area AA1. The default area AA1 may remain visually exposed on the front side of the electronic device 300. The area by which the expansion area AA2 is exposed on the front side of the electronic device 300 may vary depending on a state of the electronic device 300. The expansion area AA2 may extend from one side of the default area AA1. For example, the default area AA1 may refer to a partial area of the display 350 visually exposed on the front side of the electronic device 300 in the first state. The expansion area AA2 may refer to an area that is located inside the electronic device 300 in the first state and that at least partially moves out of the electronic device 300 in the second state and is visually exposed on the front side of the electronic device 300.

In an embodiment, the first state may be a state in which the default area AA1 forms the front side of the electronic device 300 and the expansion area AA2 is located inside the first structure 310, and the second state may be a state in which at least a portion of the expansion area AA2, together with the default area AA1, forms the front side of the electronic device 300. In the electronic device 300, as the expansion area AA2 is additionally exposed on the front surface of the electronic device 300 in the second state, the exposed area of the display 350 may be expanded. The display 350 may include a display area that is visually exposed on the front surface of the electronic device 300 and on which given visual information (or screen) is displayed. For example, in the first state, the display area may correspond to the default area AA1. In the second state, the display area may correspond to a portion of the expansion area AA2 and the default area AA1. Because a screen is capable of being displayed even on the portion of the expansion area AA2 together with the default area AA1 in the second state, the electronic device 300 may provide an expanded display area, as compared with when the electronic device 300 is in the first state.

Figure 5:
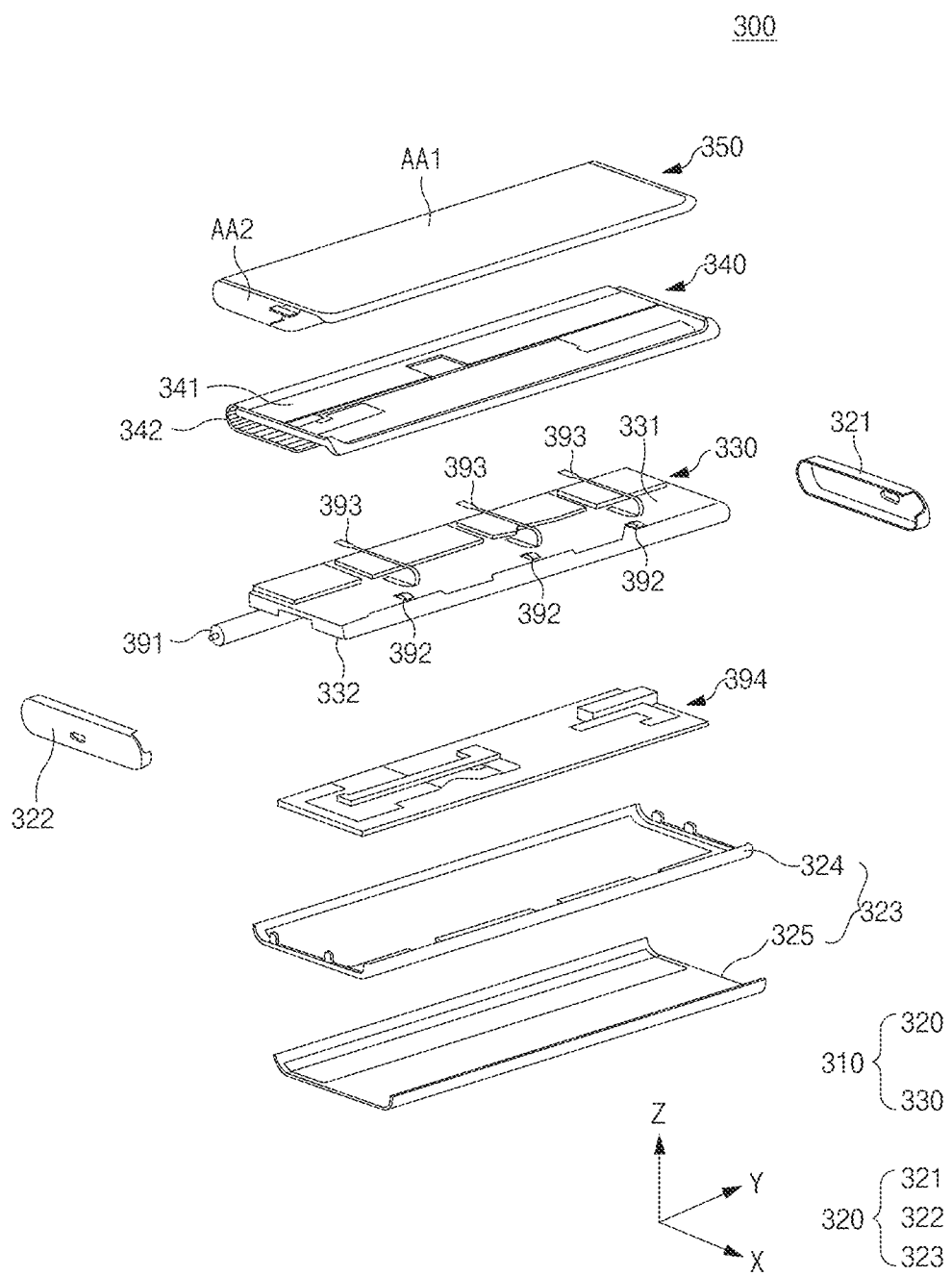
FIG. 5 is an exploded perspective view of an electronic device according to an embodiment.
Figure 6:
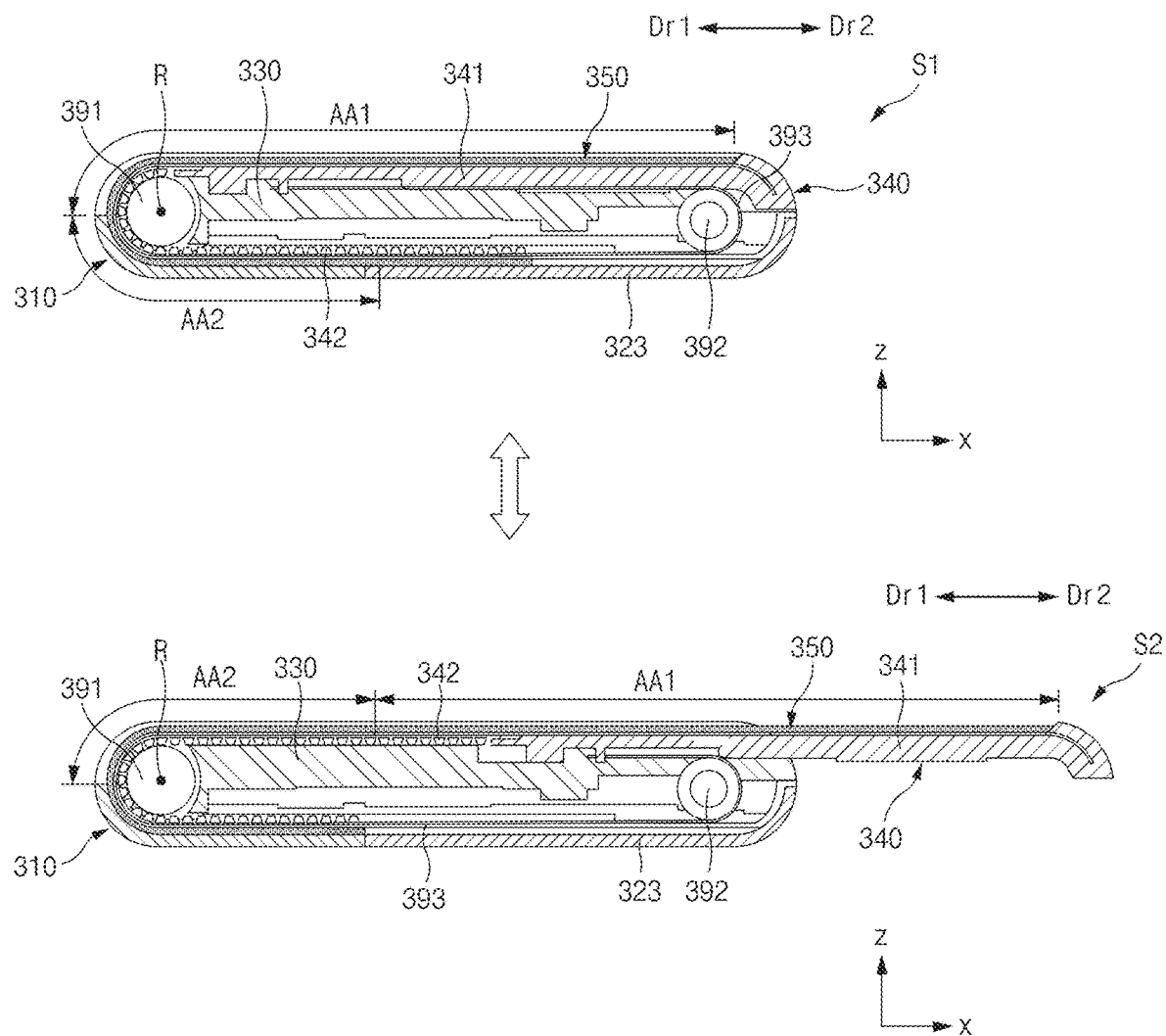
FIG. 6 is a cross-sectional view of an electronic device according to an embodiment.

FIG. 5 is an exploded perspective view of an electronic device according to an embodiment; FIG. 6 is a cross-sectional view of an electronic device according to an embodiment. FIG. 6 illustrates a first state S1 and a second state S2 of an electronic device according to an embodiment.

Referring to FIGS. 5 and 6, the electronic device 300 according to an embodiment may include the first structure (e.g., housing) 310, the second structure (e.g., housing) 340, the display 350, a first roller 391, a second roller 392, a tension belt 393, and a circuit board 394.

In an embodiment, the first structure 310 may include a case 320 and a bracket 330. The bracket 330 may be coupled to the case 320, and at least a portion of the bracket 330 may be surrounded by the case 320. For example, the bracket 330 may be fixed to the case 320, and positions of the case 320 and the bracket 330 may be changed relative to the second structure 340 depending on a sliding motion of the second structure 340. The second structure 340 and the display 350 may slide with respect to the case 320 and the bracket 330.

In an embodiment, the case 320 may form at least a portion of the exterior of the electronic device 300. The case 320 may include a first side member 321, a second side member 322, and a back member 323. The first side member 321 and the second side member 322 may be disposed to face each other in a direction (e.g., the Y-axis direction) that is substantially perpendicular to a sliding direction (e.g., the first direction Dr1 or the second direction Dr2) of the second structure 340. The back member 323 may be interposed between the first side member 321 and the second side member 322 and may be connected with the first side member 321 and the second side member 322. The first side member 321, the second side member 322, and the back member 323 may be coupled to form a space in which at least some of the remaining components (e.g., the bracket 330, the second structure 340, and the circuit board 394) of the electronic device 300 are disposed.

In an embodiment, the back member 323 may include a frame 324 and a cover 325. For example, the frame 324 may be coupled to the bracket 330. The cover 325 may be coupled to the frame 324 to form at least a portion of a back surface of the electronic device 300. A space in which the second structure 340 and the expansion area AA2 of the display 350 are accommodated may be located between the cover 325 and the bracket 330.

According to the illustrated embodiment, the first side member 321, the second side member 322, the frame 324, and/or the cover 325 may be respectively implemented with separate components and may be provided in a state of being assembled or coupled to each other. However, the disclosure is not limited thereto. For example, according to various embodiments of the disclosure, the first side member 321, the second side member 322, the frame 324, and/or the cover 325 may be integrally implemented as one part.

In an embodiment, the bracket 330 may be disposed to at least partially overlap the second structure 340. A first surface 331 of the bracket 330 (e.g., a surface or an upper surface facing the +z-axis direction in FIG. 5) may face a plate portion 341 of the second structure 340, and a second surface 332 of the bracket 330 (e.g., a surface or a lower surface facing the −z-axis direction in FIG. 5) may face the circuit board 394. The circuit board 394 may be disposed on the second surface 332 of the bracket 330.

In an embodiment, the second structure 340 may be disposed to surround at least a portion of the bracket 330. The second structure 340 may include the plate portion 341 supporting a portion of the default area AA1 of the display 350 and a multi joint member 342 supporting another portion of the default area AA1 of the display 350 and a portion of the expansion area AA2. For example, the multi joint member 342 may extend from the plate portion 341 and may be curved (or bent). The multi joint member 342 may at least partially form a curved surface in response to a sliding motion of the second structure 340.

In an embodiment, the multi joint member 342 may be coupled to the first roller 391. The multi joint member 342 may include a plurality of bars that extend in a direction substantially parallel to a rolling axis "R" of the first roller 391. For example, the multi joint member 342 may include a flexible track or a hinge rail. According to an embodiment, the plate portion 341 may be configured to slidably move in the first direction Dr1 or the second direction Dr2. A portion of the multi joint member 342 may be configured to be rotated by the first roller 391, and another portion thereof may be configured to slidably move in the first direction Dr1 or the second direction Dr2.

In an embodiment, the first roller 391 may be disposed on one side of the bracket 330. The first roller 391 may be coupled to be rotatable relative to the bracket 330. For example, the first roller 391 may rotate in opposite directions around the rolling axis "R" depending on a sliding motion of the second structure 340. The first roller 391 may make contact with a portion of the multi-joint member 342 of the second structure 340. For example, the second structure 340 may be disposed such that the multi joint member 342 surrounds at least a portion of the first roller 391. The first roller 391 may be configured to rotate a portion of the multi-joint member 342. The first roller 391 may make contact with different areas of the multi-joint member 342 as a state of the electronic device 300 changes.

In an embodiment, the second structure 340 may be coupled to the bracket 330 so as to be slidable by the tension belt 393 and the second roller 392. The tension belt 393 may connect an end portion of the plate portion 341 of the second structure 340 and an end portion of the multi joint member 342. The second roller 392 may be configured to rotate in the same direction as the first roller 391 depending on the sliding motion of the second structure 340. For example, the tension belt 393 may be configured to provide tension to the multi-joint member 342 between the plate portion 341 and the multi joint member 342. According to an embodiment, when the plate portion 341 moves in the first direction Dr1, one end portion of the tension belt 393 that is connected with the plate portion 341 may move in the first direction Dr1, and an opposite end portion of the tension belt 393 that is connected with the multi joint member 342 may move in the second direction Dr2. In contrast, when the plate portion 341 moves in the second direction Dr2, the one end portion of the tension belt 393 may move in the second direction Dr2, and the opposite end portion of the tension belt 393 may move in the first direction Dr1. However, the illustrated embodiment is an example; according to various embodiments, the electronic device 300 may not include at least one of the second roller 392 and the tension belt 393.

In an embodiment, the display 350 may be disposed on the second structure 340. For example, the display 350 may be coupled to the second structure 340 so as to slidably move relative to the first structure 310 together with the second structure 340. The display 350 may include the default area AA1 and the expansion area AA2 extending from the default area AA1. For example, the default area AA1 may refer to an area visually exposed on the front side of the electronic device 300 in the first state. The expansion area AA2 may refer to an area that is located inside the electronic device 300 in the first state and that at least partially moves out of the electronic device 300 when the electronic device 300 is changed to the second state and is visually exposed on the front side of the electronic device 300.

The electronic device 300 according to an embodiment may be configured such that the default area AA1 is exposed on the front surface of the electronic device 300 in the first state and at least a portion of the expansion area AA2 is exposed on the front surface of the electronic device 300 together with the default area AA1. As at least a portion of the expansion area AA2 rotates depending on the rotation of the first roller 391, a position of the expansion area AA2 may be changed. For example, as the second structure 340 moves in the first direction Dr1 relative to the first structure 310, the expansion area AA2 may be located on the front side of the electronic device 300 together with the default area AA1. Also, as the second structure 340 moves in the second direction Dr2 relative to the first structure 310, the expansion area AA2 may be accommodated in the space between the bracket 330 and the back member 323.

In an embodiment, the circuit board 394 may be disposed in the first structure 310. The circuit board 394 may be interposed between the bracket 330 and the back member 323. For example, the circuit board 394 may be supported by the bracket 330 so as to be disposed within the electronic device 300. The circuit board 394 may be coupled to at least a partial area of the second surface 332 of the bracket 330 so as to be fixed to the first structure 310. In the sliding motion of the second structure 340, the circuit board 394 may move relative to the second structure 340 together with the first structure 310.

In an embodiment, the circuit board 394 may include a printed circuit board (PCB), a flexible PCB (FPCB), or a rigid-flexible PCB (RFPCB). Various electronic parts included in the electronic device 300 may be electrically connected with the circuit board 394. A processor (e.g., the processor 120 of FIG. 1), a memory (e.g., the memory 130 of FIG. 1), and/or an interface (e.g., the interface 177 of FIG. 1) may be disposed on the circuit board 394. For example, the processor may include a main processor and/or an auxiliary processor, and the main processor and/or the auxiliary processor may include one or more of a central processing unit, an application processor, a graphics processor device, an image signal processor, a sensor hub processor, or a communication processor. For example, the memory may include a volatile memory or a nonvolatile memory. For example, the interface may include a high definition multimedia interface (HDMI), a universal serial bus (USB) interface, a secure digital (SD) card interface, and/or an audio interface. Also, the interface may electrically or physically connect the electronic device 300 with an external electronic device and may include a USB connector, an SD card/MMC connector, or an audio connector.

In an embodiment, a battery (e.g., the battery 189 of FIG. 1) may supply a power to at least one component of the electronic device 300. The battery may be integrally disposed within the electronic device 300, or may be disposed to be removable from the electronic device 300. According to various embodiments of the disclosure, the battery may be supported by the bracket 330 together with the circuit board 394 so as to be disposed within the electronic device 300. The battery may be coupled to at least a partial area of the second surface 332 of the bracket 330. The battery may be disposed on substantially the same plane as the circuit board 394. In the sliding motion of the second structure 340, the battery may move relative to the second structure 340 together with the first structure 310.

The electronic device 300 illustrated in FIGS. 5 and 6 corresponds to an embodiment of an electronic device of a slidable (or rollable) type, and the structure of the electronic device 300 according to various embodiments of the disclosure is not limited to the illustrated embodiment. For example, the electronic device 300 may be implemented with various forms of slidable (or rollable)-type electronic devices that include a fixed structure and a moving structure movable relative to the fixed structure and in which a display area is expanded or reduced as a flexible display moves together with the moving structure. For another example, the electronic device 300 may be implemented with a foldable electronic device in which one area of a display is folded or unfolded.

Figure 7:
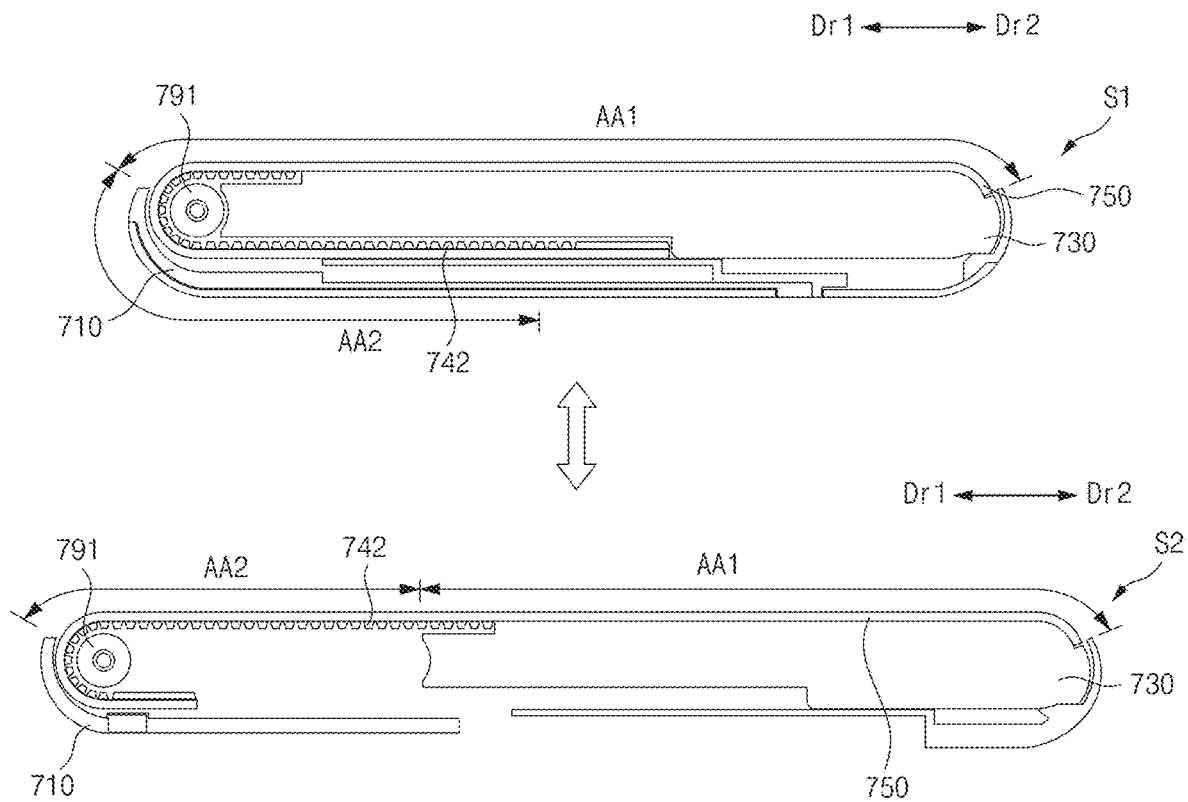
FIG. 7 is a cross-sectional view of an electronic device according to an embodiment.

Below, a first state and a second state of an electronic device according to an embodiment will be described with reference to FIG. 7. FIG. 7 is a cross-sectional view of an electronic device according to an embodiment. FIG. 7 illustrates a first state S1 and a second state S2 of an electronic device according to an embodiment.

Referring to FIG. 7, the electronic device according to an embodiment may include a case 710, a bracket 730, a display 750, a roller 791, and a multi-joint member 742.

The case 710 may form at least a portion of the exterior of the electronic device.

The bracket 730 may be disposed to overlap the default area AA1 of the display 750. A circuit board (e.g., the circuit board 394 of FIG. 5) may be disposed on one surface of the bracket 730. The bracket 730 may be fixed to the display 750 and may be configured to slidably move in the first direction Dr1 or the second direction Dr2 together with the display 750. As the electronic device is changed from the first state S1 to the second state S2, the bracket 730 may slidably move in the second direction Dr2 so as to move away from the roller 791. As the electronic device is changed from the second state S2 to the first state S1, the bracket 730 may slidably move in the first direction Dr1 so as to move toward the roller 791.

The multi joint member 742 may be coupled to the roller 791. The multi-joint member 742 may include a plurality of bars that extend in a direction substantially parallel to a rolling axis of the roller 791. A portion of the multi-joint member 742 may be configured to be rotated by the roller 791, and another portion thereof may be configured to slidably move in the first direction Dr1 or the second direction Dr2.

The roller 791 may rotate in opposite directions around the rolling axis depending on a sliding motion of the bracket 730. The roller 791 may make contact with a portion of the multi joint member 742. The roller 791 may be configured to rotate a portion of the multi joint member 742. The roller 791 may make contact with different areas of the multi joint member 742 as a state of the electronic device changes.

At least a portion of the display 750 may be fixed to the bracket 730. For example, the display 750 may be coupled to the bracket 730 so as to slidably move together with the bracket 730. The display 750 may include the default area AA1 and the expansion area AA2 extending from the default area AA1. For example, the default area AA1 may refer to an area visually exposed on the front side of the electronic device in the first state S1. The expansion area AA2 may refer to an area that is located inside the electronic device in the first state and that at least partially moves out of the electronic device when the electronic device is changed to the second state S2 and is visually exposed on the front side of the electronic device.

Figure 8:
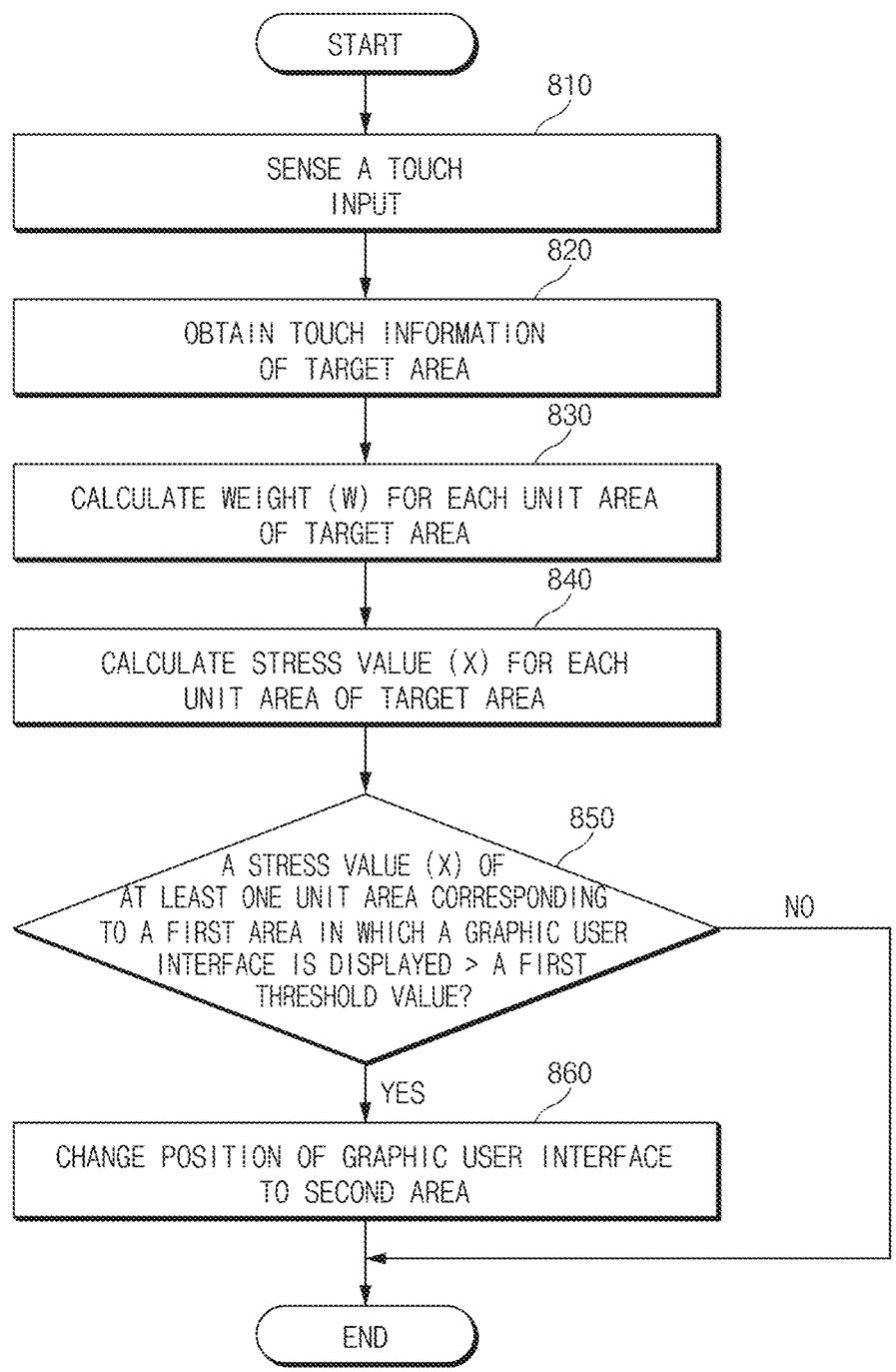
FIG. 8 is a flowchart illustrating an example operation of an electronic device according to an embodiment.

Below, an operation of an electronic device according to an embodiment will be described with reference to FIG. 8. FIG. 8 is a flowchart illustrating an example operation of an electronic device according to an embodiment. Below, an operation of an electronic device may be referred to as an operation of a processor (e.g., the processor 120 of FIG. 1).

In operation 810, the electronic device according to an embodiment may sense a touch input of an object (e.g., a finger or a digital pen). The electronic device may sense the touch of the object by using a touch circuit (e.g., the touch circuit 250 of FIG. 2) or a digitizer. The touch circuit or the digitizer may sense the touch of the object, which is made on an area corresponding to a default area (e.g., the default area AA1 of FIG. 7) and an expansion area (e.g., the expansion area AA2 of FIG. 7) of a display (e.g., the display 750 of FIG. 7). The electronic device according to an embodiment may check information of a touch type and an object. For example, the electronic device may determine whether the touch of the object is a direct touch or an indirect touch (e.g., a proximity input, a mouse, or an air action mode of a digital pen). For another example, the electronic device may detect whether the object making contact with the area corresponds to any one of a body (e.g., a finger) of a user or a digital pen. Below, the "touch" may correspond to a direct touch that is physically directly made on the display (e.g., the display 750 of FIG. 7) or on a window (not illustrated) disposed on the display.

In operation 820, the electronic device according to an embodiment may obtain touch information of a target area. The target area may be designated as an area corresponding to at least a portion of the display. The target area may be an area in which the display is not supported by a bracket (e.g., the bracket 330 of FIG. 6 or the bracket 730 of FIG. 7) in the second state of the electronic device. For example, in the case of the electronic device of FIG. 6, in which at least a portion of the default area AA1 of the display 350 does not overlap the bracket 330 in the second state S2, an area not overlapping the bracket 330 from among the default area AA1 of the display 350 may be designated as the target area. For example, in the case of the electronic device of FIG. 7, in which the expansion area AA2 of the display 750 does not overlap the bracket 730 in the second state S2, the expansion area AA2 of the display 750 may be designated as the target area. However, according to an embodiment, the target area of the electronic device may be designated as arbitrary area in which it is necessary to calculate a stress value of a touch. For example, the target area of the electronic device may be designated as an area in which a stress value of a touch exceeds a specified value. The electronic device according to an embodiment may divide the target area into a plurality of unit areas and may obtain touch information about a touch made once. The touch information may include at least one of a touch time, a total touch area, and a touch area in a unit area, which are associated with the touch made once.

In operation 830, the electronic device according to an embodiment may calculate a weight "W" for each unit area of the target area. The electronic device may calculate weights respectively corresponding to the plurality of unit areas of the target area based on the obtained touch information. For example, the weight "W" associated with one unit area may be calculated by Equation 1 below.

$$W=(g/G)*(a/A)*(t/T) \quad \text{[Equation 1]}$$

In Equation 1 above, "G" may represent a total area of one unit area, "A" may represent a total touch area determined in advance, and "T" may be a touch time determined in advance. "g" may represent a touch area in a unit area, in which a sensed one-time touch is made, "a" may represent a total touch area associated with the sensed one-time touch, and "t" may represent a real touch time associated with the sensed one-time touch. Values of "g", "a", and "t" may be set based on the obtained touch information.

The electronic device according to an embodiment may calculate the weights "W" respectively corresponding to the plurality of unit areas, based on at least a portion of information according to a touch simulation determining a value of maximum stress endurable by the display for each unit area and the obtained touch information. For example, "A" may refer to a total touch area used in the touch simulation, and "T" may refer to a touch time used in the touch simulation. For example, values of "A" and "T" may be differently set depending on a kind of an object (i.e., a finger or a digital pen), and the electronic device may sense a kind of an object and may calculate the weight "W" by using values of "A" and "T" corresponding to the kind of the object thus sensed. Equation 1 above is only one example for calculating the weight "W", and an equation for calculating a weight is not limited to Equation 1. For example, the touch information may include a kind of an object or touch pressure according to the kind of the object. The electronic device may identify a kind of an object (e.g., a finger or a digital pen) and may calculate a weight based on a touch pressure value that is differently set depending on a kind of an object.

In operation 840, the electronic device according to an embodiment may calculate a stress value "X" for each unit area of the target area based on the calculated weight. The electronic device may calculate the stress value "X" of one unit area by accumulating weights that are calculated with respect to touches input to one unit area until a time at which the stress value "X" is calculated. For example, after an n-th touch is made in one unit area, a stress value $X_n$ may be calculated by Equation 2 below.

$$X_n = X_{(n-1)} + W_n \quad \text{[Equation 2]}$$

In Equation 2 above, "$X_n$" may represent a stress value of one unit area calculated by accumulating weights until an n-th touch, and "$X_{(n-1)}$" may represent a previous stress value of one unit area calculated by accumulating weights until a (n-1)-th touch. "We" may represent a weight for the n-th touch. For example, the electronic device may calculate the stress values "X" respectively corresponding to the unit areas of the target area and may store the stress values "X" in a memory (e.g., the memory 130 of FIG. 1). Equation 2 above is only one example for calculating the stress value "X", and an equation for calculating a stress value is not limited to Equation 2.

In operation 850, the electronic device according to an embodiment may determine whether a stress value of at least one unit area corresponding to a first area of the display in which a graphic user interface (GUI) is displayed (or which is set such that the graphic user interface is displayed) is greater than a first threshold value. For example, the first threshold value may be set to 70% of the maximum stress value determined by the touch simulation. According to an embodiment, the first threshold value may include values that are set to correspond to the plurality of unit areas, respectively. For example, the first threshold value may be differently set for each unit area, based on a difference between support structures for respective areas of the display. For example, the first threshold value of a unit area located at the center of the target area may be set to be smaller than the first threshold value of a unit area located at a periphery of the target area, in which a support structure is relatively strong.

When it is determined that a stress value corresponding to the at least one unit area of the first area is greater than the first threshold value, in operation 860, the electronic device may change a position of the graphic user interface to a second area. The electronic device may control the display such that the display displays the graphic user interface in the second area. At least a portion of the second area may be different from the first area. The electronic device may display the graphic user interface through the display, and may sense a touch input to the graphic user interface to perform a specified operation. According to an embodiment, before displaying a graphic user interface, the electronic device may determine whether a graphic user interface to be displayed is a graphic user interface (e.g., an icon or a button) having the high probability of occurrence of a touch input of the user, and may control the display such that the graphic user interface having the high probability of occurrence of a touch input is displayed in the second area, not the first area.

According to an embodiment, when it is determined that the stress value corresponding to the at least one unit area of the first area is greater than the first threshold value, the electronic device may move the graphic user interface being displayed in the first area to the second area so as to be displayed in the second area. According to an embodiment, in the case where the electronic device is displaying a graphic user interface through the display, even though it is determined that the stress value corresponding to the at least one unit area of the first area is greater than the first threshold value, the electronic device may maintain a position of the graphic user interface at the first area; when the electronic device displays the graphic user interface next time, the electronic device may change the position of the graphic user interface to the second area so as to be displayed in the second area. The electronic device may change a position of a graphic user interface located in an area in which a stress value is greater than a specified value, and thus, the quality of an area of the display, in which the graphic user interface is located, is prevented and/or reduced from being degraded due to the accumulation of repetitive touch inputs to the area.

When it is determined that all stress values corresponding to the unit areas of the first area are smaller than or equal to the first threshold value, the electronic device may maintain the position of the graphic user interface without movement. The electronic device may display the graphic user interface in the first area of the display.

Figure 9:
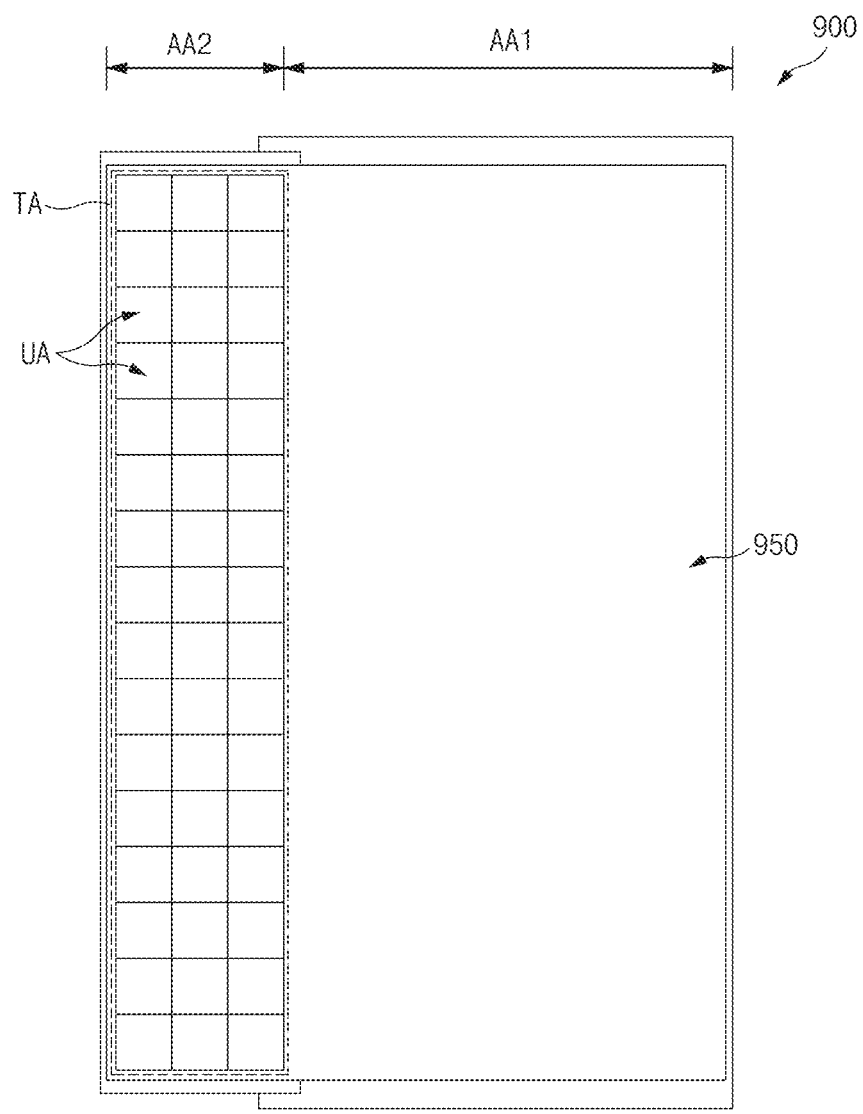
FIG. 9 is a diagram illustrating an example target area and a plurality of unit areas of an electronic device according to an embodiment.

Below, a target area TA and a plurality of unit areas UA of an electronic device 900 according to an embodiment will be described with reference to FIG. 9. FIG. 9 is a diagram illustrating the target area TA and the plurality of unit areas UA of an electronic device according to an embodiment. FIG. 9 is a diagram illustrating the second state of the electronic device 900 according to an embodiment.

The electronic device 900 according to an embodiment may include a display 950. The default area AA1 of the display 950 may be maintained in a state of being exposed on a front surface of the electronic device 900, in the first state and the second state, and the area of the expansion area AA2 visually exposed on the front surface of the electronic device 900 may change depending on a state of the electronic device 900. The electronic device 900 may display an image through the default area AA1 and the expansion area AA2 in the second state.

In the electronic device 900 according to an embodiment, at least a portion of the display areas AA1 and AA2 of the display 950 may be designated as the target area TA. The target area TA may be set to correspond to an area in which a support structure for the display 950 is relatively weak. For example, in the second state, a bracket (e.g., the bracket 730 of FIG. 7) may be located under the default area AA1 and may support the default area AA1. In this case, the expansion area AA2 that is not supported by the bracket in the second state may be set to the target area TA. For another example, in the second state, a bracket (e.g., the bracket 330 of FIG. 6) may be located under a partial area of the expansion area AA2 and the default area AA1. In this case, the remaining partial area of the default area AA1 that is not supported by the bracket in the second state may be set to the target area TA. However, according to an embodiment, a specific area that is weak to a push or press action may be designated as the target area TA, regardless of whether the support of the bracket is made.

The electronic device 900 according to an embodiment may divide the target area TA into the plurality of unit areas UA. The plurality of unit areas UA may be arranged in a lattice (or matrix) form. However, the arrangement and shape of the plurality of unit areas UA are not limited to the example illustrated in FIG. 9. The area of the plurality of unit areas UA may be determined based on a total touch area for a one-time touch of an object. For example, the area of the plurality of unit areas UA may be determined based on an average value of the total touch area when a touch of a general user is made once.

The electronic device 900 according to an embodiment may obtain touch information from the target area TA divided into the plurality of unit areas UA (e.g., 820 of FIG. 8), may calculate a weight corresponding to each of the plurality of unit areas UA (e.g., 830 of FIG. 8), and may calculate a stress value corresponding to each of the plurality of unit areas UA (e.g., 840 of FIG. 8). The plurality of unit areas UA may refer, for example, to virtual areas for calculating a stress value for each area, and the division for the plurality of unit areas UA is not viewed to the user.

Figure 10:
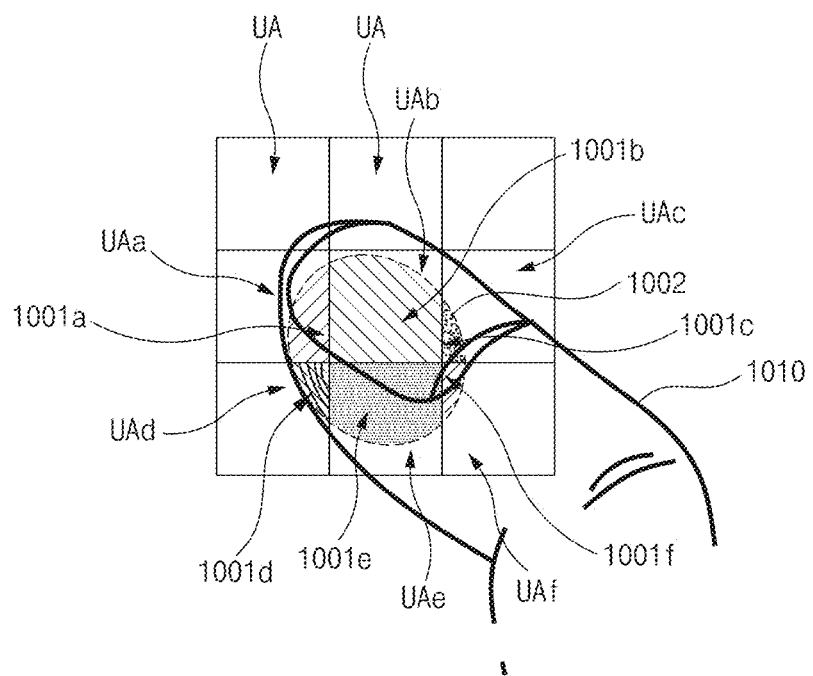
FIG. 10 is a diagram illustrating an example touch area associated with a partial area of an electronic device according to an embodiment.

FIG. 10 is a diagram illustrating an example touch area associated with a partial area of an electronic device according to an embodiment. An electronic device according to an embodiment may divide the target area TA of a display (e.g., the display 950 of FIG. 9) into the plurality of unit areas UA to obtain touch information about a touch of an object 1010 (e.g., 820 of FIG. 8). The touch information may include a touch time for a one-time touch, a total touch area 1002, and the touch areas 1001a, 1001b, 1001c, 1001d, 1001e, and 1001f of the unit areas UA. Based on the touch information obtained with respect to the touch of the object, the electronic device may calculate a weight and a stress value of each of unit areas UAa, UAb, UAc, UAd, UAe, and UAf each including at least a portion of the area touched by the object.

For example, first touch information about the first unit area UAa may include a touch time, the total touch area 1002, and the touch area 1001a in the first unit area UAa. A weight of the first unit area UAa may be calculated based on the first touch information, and a stress value of the first unit area UAa may be calculated by accumulating (or adding) the calculated weight and a previous stress value. Second touch information about the second unit area UAb may include a touch time, the total touch area 1002, and the touch area 1001b in the second unit area UAb. A weight of the second unit area UAb may be calculated based on the second touch information, and a stress value of the second unit area UAb may be calculated by accumulating (or adding) the calculated weight and a previous stress value. Stress values of the remaining unit areas UAc, UAd, UAe, and UAf including the area touched by the object may also be calculated in the same manner as described above. Previous stress values of unit areas UA that do not include the area touched by the object may be maintained.

Figure 11:
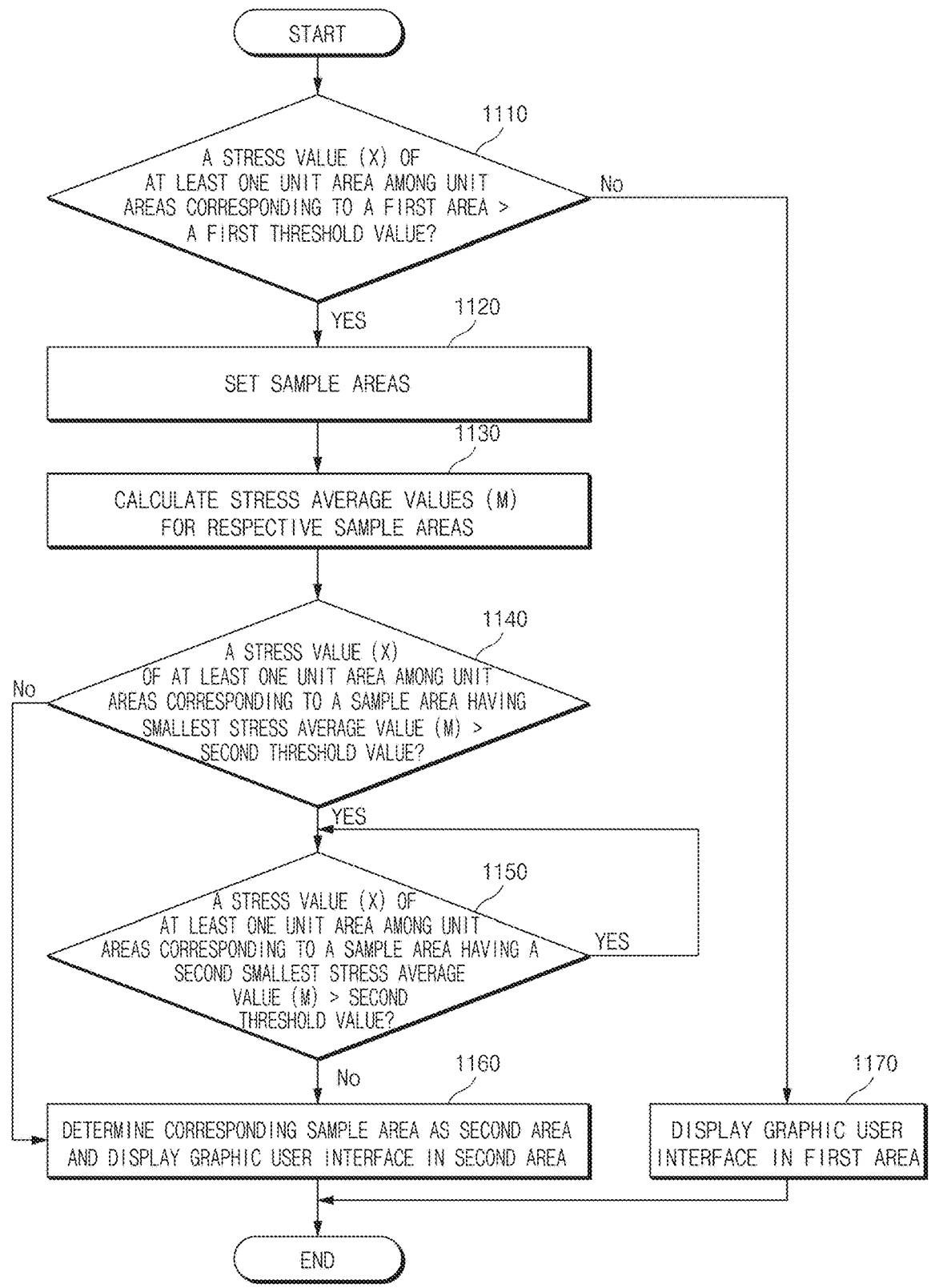
FIG. 11 is a flowchart illustrating an example operation of an electronic device according to an embodiment.

Below, an operation (e.g., 860 of FIG. 8) of moving a position of a graphic user interface of an electronic device will be described in detail with reference to FIG. 11. FIG. 11 is a flowchart illustrating an example operation of an electronic device according to an embodiment. Below, an example operation of an electronic device may be referred to as an operation of a processor (e.g., the processor 120 of FIG. 1).

In operation 1110, the electronic device according to an embodiment may determine whether a stress value of at least one unit area corresponding to a first area of a display in which a graphic user interface is displayed (or which is set such that the graphic user interface is displayed) is greater than the first threshold value. For example, the first threshold value may be set to 70% of a maximum stress value determined by a simulation. For example, the first threshold value may be differently set for each unit area, based on a support structure of each unit area. For example, the first threshold value corresponding to the center of a target area may be set to be smaller than the first threshold value corresponding to a periphery thereof. For another example, the graphic user interface may be displayed on the display based on execution of one application, and the first threshold value may be set to be low as the frequency that the application is used increases.

When it is determined that all stress values of the unit areas corresponding to the first area are smaller than or equal to the first threshold value, in operation 1170, the electronic device may display the graphic user interface in the first area, which corresponds to an existing position of the graphic user interface, through the display.

When it is determined that a stress value of at least one unit area among unit areas corresponding to the first area is greater than the first threshold value, in operation 1120, the electronic device may set sample areas in the display area of the display. The sample areas may be located around the first area. The sample areas may be areas that are located around the first area and in which the graphic user interface is capable of being displayed. For example, the sample areas may be set to surrounding areas of the first area, which are located in specified directions with respect to the first area. According to an embodiment, the electronic device may set the sample areas in a touch-possible area being the remaining area other than a touch-impossible area that is capable of being set according to an execution mode (e.g., a one-hand operation mode) or an application being executed.

In operation 1130, the electronic device according to an embodiment may calculate a stress average value "M" of each of the sample areas. The stress average value "M" of the sample area may be an average value of stress values "X" respectively corresponding to unit areas located in the sample area.

In operation 1140, the electronic device according to an embodiment may determine whether the stress value "X" of at least one of unit areas corresponding to a sample area, in which the stress average value "M" is the smallest, is greater than the second threshold value. For example, the second threshold value may be set to 70% of the maximum stress value determined by the touch simulation. For example, the second threshold value may be set for each of a plurality of unit areas. For example, the second threshold value corresponding to the center of a target area may be set to be smaller than the second threshold value corresponding to a periphery thereof. The second threshold value may be equal to the first threshold value. According to an embodiment, the second threshold value may be different from the first threshold value.

When it is determined that all stress values "X" of unit areas located in a sample area, in which the stress average value "M" is the smallest, are smaller than or equal to the second threshold value, in operation 1160, the electronic device may determine the corresponding sample area as a second area and may display the graphic user interface in the second area thus determined.

When it is determined that the stress value "X" of at least one of the unit areas located in the sample area, in which the stress average value "M" is the smallest, is greater than the second threshold value, in operation 1150, the electronic device may determine whether the stress value "X" of at least one of unit areas located in a sample area having the second smallest stress average value "M" is greater than the second threshold value.

When it is determined that the stress value "X" of the at least one of the unit areas located in the sample area having the second smallest stress average value "M" is greater than the second threshold value, the electronic device may return to operation 1150.

When it is determined that all stress values "X" of the unit areas located in the sample area having the second smallest stress average value "m" are smaller than or equal to the second threshold value, in operation 1160, the electronic device may determine the corresponding sample area as the second area and may display the graphic user interface in the second area thus determined.

Figure 12:
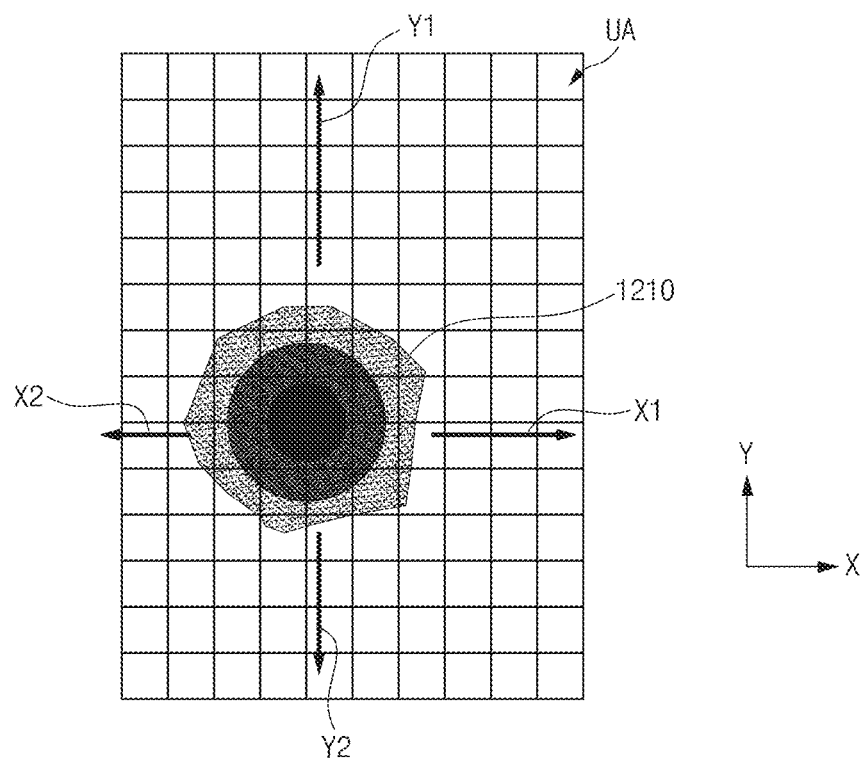
FIG. 12 is a diagram illustrating an example stress map associated with a stress value for each unit area

FIG. 12 is a diagram illustrating an example stress map associated with a stress value for each unit area. An electronic device according to an embodiment may generate information about stress values of unit areas in the form of a stress map.

Referring to FIG. 12, the electronic device may display different colors depending on stress values of the unit areas UA in the stress map or an average of the stress values. The electronic device according to an embodiment may set sample areas, to which a graphic user interface is movable, based on the stress map and may move the graphic user interface. For example, in the case where a first area in which the graphic user interface is displayed is located in an area 1210 having a stress value greater than a specified threshold value, the electronic device may designate surrounding areas located in specified directions X1, X2, Y1, and Y2 with respect to the first area as sample areas, may determine one of the sample areas as a second area, and may display the graphic user interface in the second area. For example, the electronic device may designate areas, which are located in a +X direction X1, a −X direction X2, a +Y direction Y1, and a −Y direction Y2 with respect to the area 1210 having a stress value greater than the specified threshold value, from among the unit areas UA as sample areas. FIG. 12 shows an example of the specified directions, and a direction in which a graphic user interface is movable is not limited to the example of FIG. 12.

Figure 13:
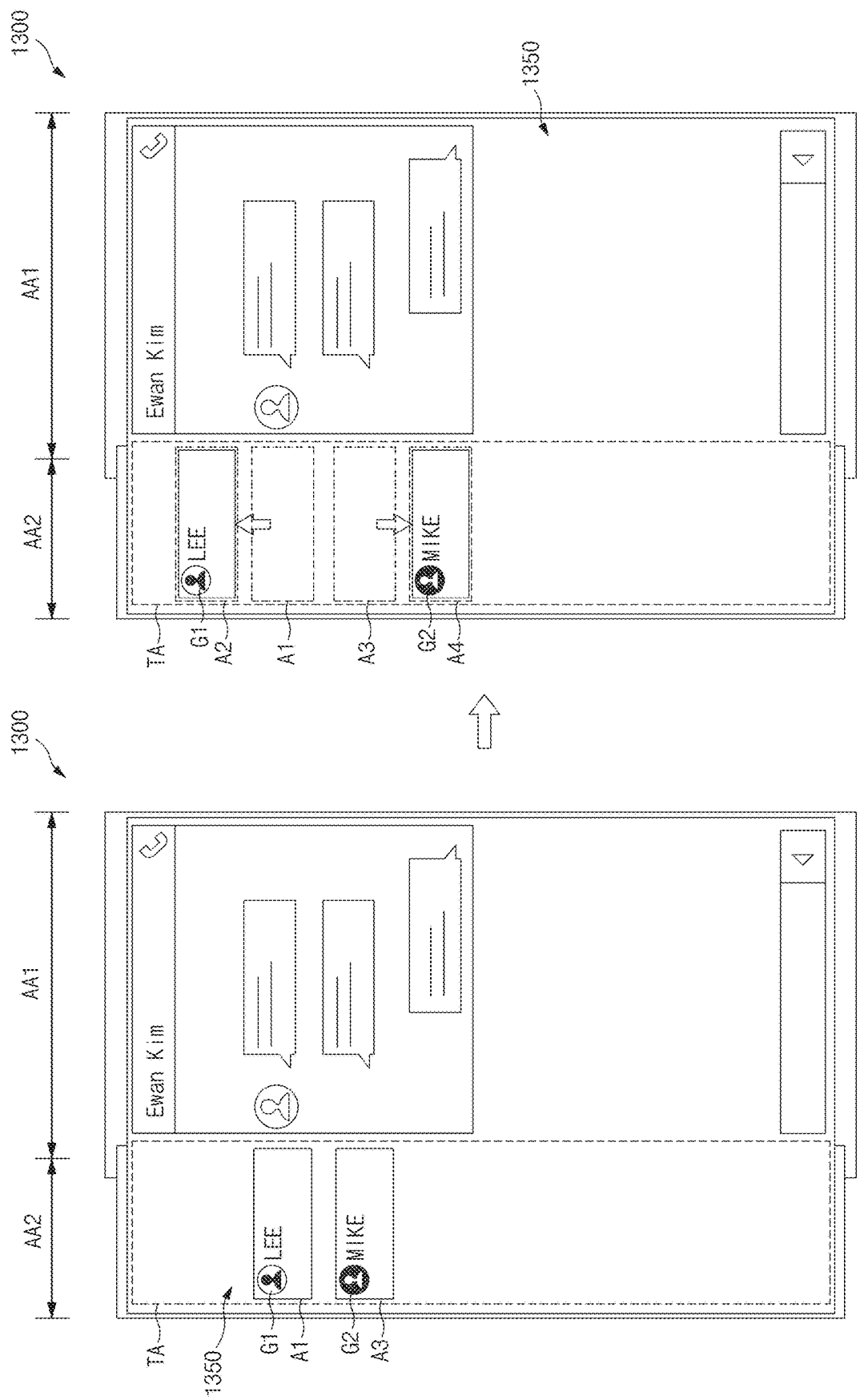
FIG. 13 is a diagram illustrating example movement of a graphic user interface in a second state of an electronic device according to an embodiment.

Below, how an electronic device according to an embodiment moves a graphic user interface will be described with reference to FIG. 13. FIG. 13 is a diagram illustrating movement of a graphic user interface in a second state of an electronic device according to an embodiment.

Referring to FIG. 13, an electronic device 1300 according to an embodiment may include a display 1350, and the display 1350 may include the default area AA1 and the expansion area AA2. In the electronic device 1300 according to an embodiment, the target area TA may be located in the expansion area AA2. The electronic device 1300 may display a first graphic user interface G1 and a second graphic user interface G2 in the expansion area AA2 (or the target area TA) through the display 1350.

When a stress value of at least one unit area of a first area A1 in which the first graphic user interface G1 is located is greater than the specified threshold value, the electronic device 1300 may change a position of the first graphic user interface G1 to a second area A2 in the expansion area AA2. The electronic device 1300 may set the second area A2, based on a stress average value of a surrounding area of the first area A1 and stress values of unit areas thereof. For example, the electronic device 1300 may designate sample areas around the first area A1, and may set, to the second area A2, a sample area in which the stress average value "M" is small and the stress values "X" of unit areas do not exceed the specified threshold value. The electronic device 1300 may move the first graphic user interface G1 to the second area A2 so as to be displayed therein. For example, the second area A2 may be located in the expansion area AA2 (or the target area TA).

Likewise, when a stress value of at least one unit area of a third area A3 in which the second graphic user interface G2 is located is greater than the specified threshold value, the electronic device 1300 may change a position of the second graphic user interface G2 to a fourth area A4 in the expansion area AA2. The electronic device 1300 may set the fourth area A4, based on a stress average value of a surrounding area of the third area A3 and stress values of unit areas thereof. For example, the electronic device 1300 may designate sample areas around the third area A3, and may set, to the fourth area A4, a sample area in which the stress average value "m" is small and the stress values "X" of unit areas do not exceed the specified threshold value. The electronic device 1300 may move the second graphic user interface G2 to the fourth area A4 so as to be displayed therein. For example, the fourth area A4 may be located in the expansion area AA2 (or the target area TA).

Below, how an electronic device according to an embodiment moves a graphic user interface will be described with reference to FIG. 14. FIG. 14 is a diagram illustrating example movement of a graphic user interface in a second state of an electronic device according to an embodiment.

Referring to FIG. 14, an electronic device 1400 according to an embodiment may include a display 1450, and the display 1450 may include the default area AA1 and the expansion area AA2. In the electronic device 1400 according to an embodiment, the target area TA may be located in the expansion area AA2. The electronic device 1400 may display a third graphic user interface G3 in the expansion area AA2 (or the target area TA) through the display 1450.

When a stress value of at least one unit area of a first area B1 in which the third graphic user interface G3 is located is greater than the specified threshold value, the electronic device 1400 may set a second area B2, based on a stress average value of a surrounding area of the first area B1 and stress values of unit areas thereof. For example, the electronic device 1400 may designate sample areas around the first area B1, and may set, to the second area B2, a sample area in which the stress average value "M" is small and the stress values "X" of unit areas do not exceed the specified threshold value.

When the second area B2 thus set is located at a boundary of the default area AA1 and the expansion area AA2, the electronic device 1400 according to an embodiment may display the third graphic user interface G3 in an area that does not overlap the boundary of the default area AA1 and the expansion area AA2. For example, the electronic device 1400 may display the third graphic user interface G3 in a third area B3 of the default area AA1. The third area B3 may be set to an area that belongs to the default area AA1 and is located around the second area B2. Because the boundary of the default area AA1 and the expansion area AA2 of the display 1450 may be weak to a press or push action due to a step of a support structure, the third graphic user interface G3 may be inhibited from moving to a boundary area of the default area AA1 and the expansion area AA2 of the display 1450, and thus, the quality of the boundary area of the default area AA1 and the expansion area AA2 may be prevented and/or reduced from being degraded.

Below, how an electronic device according to an embodiment moves a graphic user interface will be described with reference to FIG. 15. FIG. 15 is a diagram illustrating example movement of a graphic user interface in a second state of an electronic device according to an embodiment.

Referring to FIG. 15, an electronic device 1500 according to an embodiment may include a display 1550, and the display 1550 may include the default area AA1 and the expansion area AA2. In the electronic device 1500 according to an embodiment, the target area TA may be located in the expansion area AA2. The electronic device 1500 may display a fourth graphic user interface G4 in the display 1550. A first area C1 in which the fourth graphic user interface G4 is displayed may be located at a boundary of the default area AA1 and the expansion area AA2.

The electronic device 1500 according to an embodiment may move the fourth graphic user interface G4 located at a boundary of the default area AA1 and the expansion area AA2, which is relatively weak to a press or push action, to the default area AA1 so as to be displayed therein. For example, the electronic device 1500 may designate one area, which belongs to the default area AA1 and is located around the first area C1, as a second area C2 and may display the fourth graphic user interface G4 in the second area C2 of the display 1550.

Figure 16:
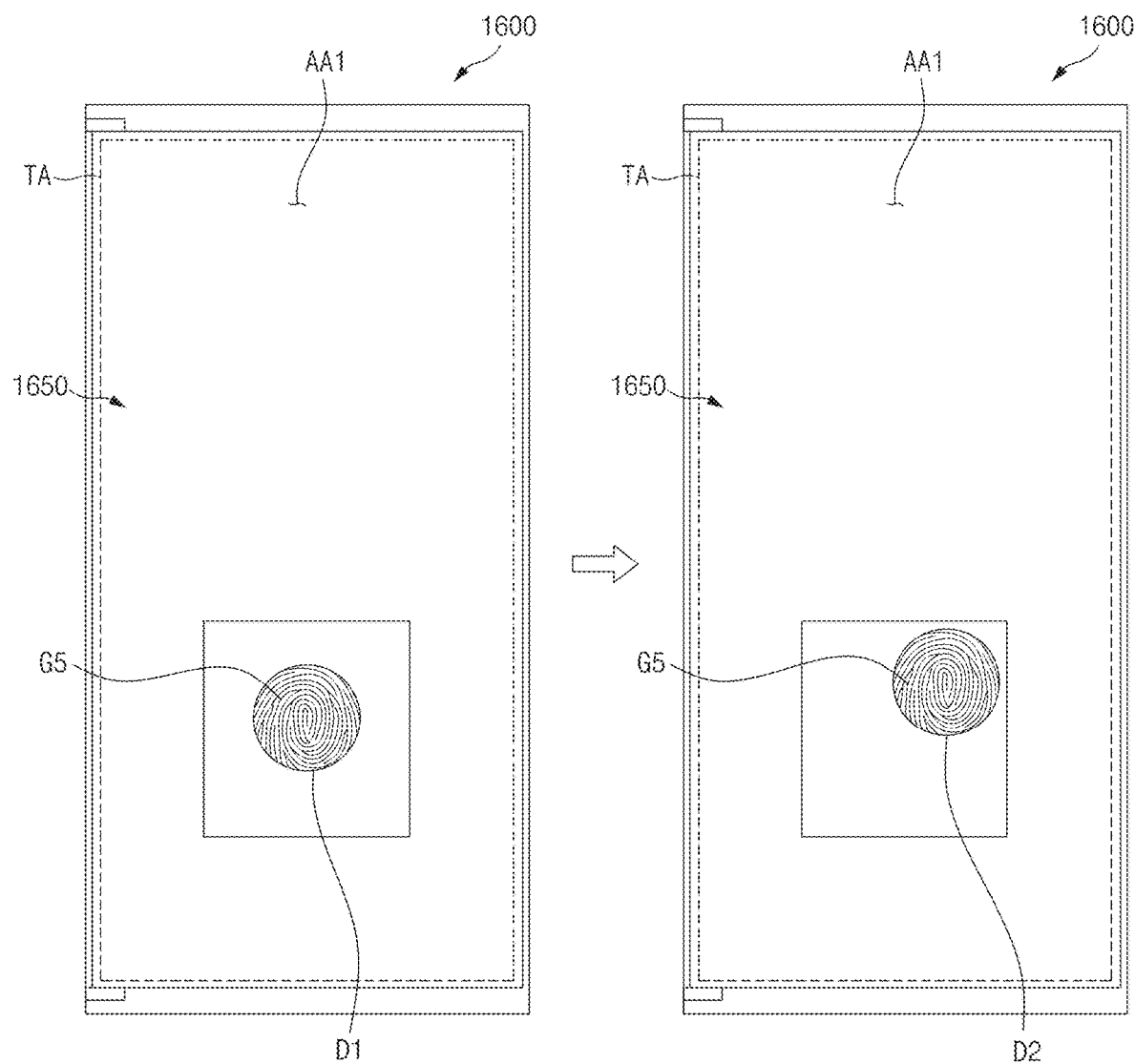
FIG. 16 is a diagram illustrating example movement of a graphic user interface in a first state of an electronic device according to an embodiment.

Below, how an electronic device according to an embodiment moves a graphic user interface will be described with reference to FIG. 16. FIG. 16 is a diagram illustrating example movement of a graphic user interface in a first state of an electronic device according to an embodiment.

Referring to FIG. 16, an electronic device 1600 according to an embodiment may include a display 1650, and the display 1650 may include the default area AA1 and the expansion area (not illustrated). The electronic device 1600 may display an image through the default area AA1 in the first state, and the expansion area may be disposed not to be exposed. In the electronic device 1600 according to an embodiment, the target area TA may be located in the default area AA1. The electronic device 1600 may display a fifth graphic user interface G5 (e.g., an icon indicating a fingerprint recognition area) in the default area AA1 (or the target area TA) through the display 1650.

When a stress value of at least one unit area of a first area D1 in which the fifth graphic user interface G5 is located is greater than the specified threshold value, the electronic device 1600 may change a position of the fifth graphic user interface G5 to a second area D2 in the default area AA1. The electronic device 1600 may set the second area D2, based on a stress average value of a surrounding area of the first area D1 and stress values of unit areas thereof. For example, the electronic device 1600 may designate sample areas around the first area D1, and may set, to the second area D2, a sample area in which the stress average value "M" is small and the stress values "X" of unit areas do not exceed the specified threshold value. The electronic device 1600 may display the fifth graphic user interface G5 in the second area D2 thus set. For example, the second area D2 may be located in the default area AA1 (or the target area TA).

Figure 17:
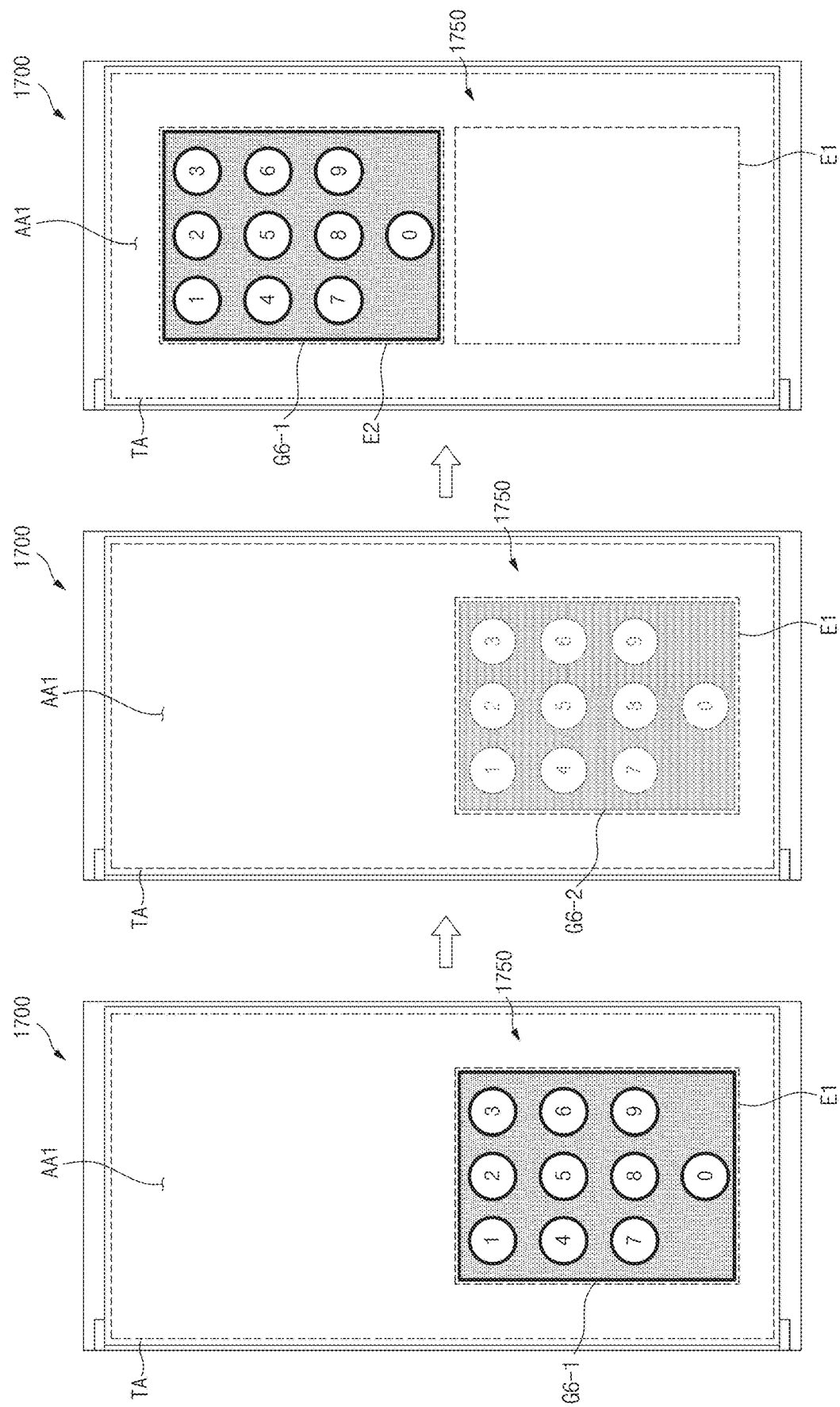
FIG. 17 is a diagram illustrating example movement of a graphic user interface in a first state of an electronic device according to an embodiment.

Below, how an electronic device according to an embodiment moves a graphic user interface will be described with reference to FIG. 17. FIG. 17 is a diagram illustrating example movement of a graphic user interface in a first state of an electronic device according to an embodiment.

Referring to FIG. 17, an electronic device 1700 according to an embodiment may include a display 1750, and the display 1750 may include the default area AA1 and the expansion area (not illustrated). The electronic device 1700 may display an image through the default area AA1 in the first state, and the expansion area may be disposed not to be exposed. In the electronic device 1700 according to an embodiment, the target area TA may be located in the default area AA1. The electronic device 1700 may display a sixth graphic user interface G6-1 in the default area AA1 (or the target area TA) through the display 1750.

When a stress value of at least one unit area of a first area E1 in which the sixth graphic user interface G6-1 is located belongs to a specified range, the electronic device 1700 according to an embodiment may change attributes of the sixth graphic user interface G6-1. For example, the electronic device 1700 may change at least one of a hue, a chroma, and a value of the sixth graphic user interface G6-1. The electronic device 1700 may display a sixth graphic user interface G6-2 of the changed attribute in the first area E1 of the display 1750. The specified range may be a range close to a threshold value at which a position of the sixth graphic user interface G6-1 is changed.

For example, when a stress value of at least one unit area of the first area E1 corresponds to a first value smaller than a threshold value or corresponds to the threshold value, the electronic device 1700 may change attributes of the sixth graphic user interface G6-1. When all stress values of unit areas of the first area E1 are smaller than the first value, the electronic device 1700 may display the sixth graphic user interface G6-1 of a first attribute in the first area E1. When a stress value of at least one unit area of the first area E1 is greater than the first value, the electronic device 1700 may display the sixth graphic user interface G6-2 of a second attribute in the first area E1. For another example, as a stress value of at least one unit area of the first area E1 in which the sixth graphic user interface G6-1 is located increases, the electronic device 1700 according to an embodiment may gradually change attributes of the sixth graphic user interface G6-1.

When a stress value of at least one unit area of the first area E1 is greater than the specified threshold value, the electronic device 1700 may display the sixth graphic user interface G6-1 whose attributes are not changed, in a second area E2. For example, when a stress value of at least one unit area of the first area E1 is greater than the specified threshold value, the electronic device 1700 may display the sixth graphic user interface G6-1 of the first attribute in the second area E2. The electronic device 1700 may set the second area E2, based on a stress average value of a surrounding area of the first area E1 and stress values of unit areas thereof. The electronic device 1700 according to an embodiment may change attributes of the sixth graphic user interface G6-1, may display a sixth graphic user interface having the changed attributes, and may notify the user that a position of the sixth graphic user interface G6-1 may be changed later.

Below, an operation of an electronic device according to an embodiment will be described with reference to FIG. 18.

Figure 18:
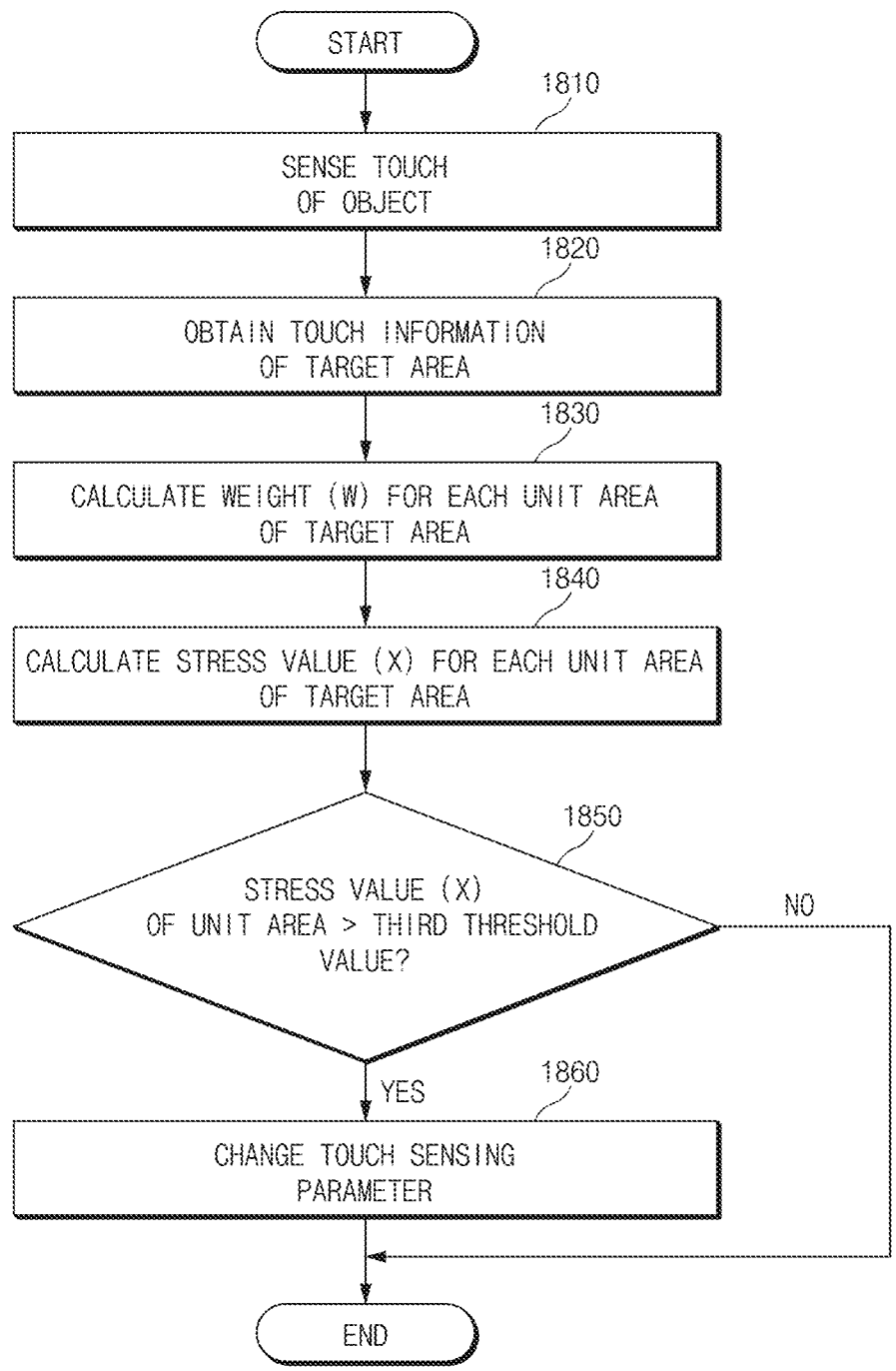
FIG. 18 is a flowchart illustrating an example operation of an electronic device according to an embodiment.

FIG. 18 is a flowchart illustrating an example operation of an electronic device according to an embodiment. Below, an operation of an electronic device may be referred to as an operation of a processor (e.g., the processor 120 of FIG. 1). The detailed description of a configuration the same as that of FIG. 8 may be referred to as the description given with reference to FIG. 8.

In operation 1810, the electronic device according to an embodiment may sense a touch of an object (e.g., a finger or a digital pen). The electronic device may sense the touch of the object by using a touch circuit (e.g., the touch circuit 250 of FIG. 2). The touch circuit may sense the touch of the object, which is made on an area corresponding to a default area (e.g., the default area AA1 of FIG. 7) and an expansion area (e.g., the expansion area AA2 of FIG. 7) of a display (e.g., the display 750 of FIG. 7).

In operation 1820, the electronic device according to an embodiment may obtain touch information of a target area. The target area may be designated as an area corresponding to at least a portion of the display. The target area may be an area in which the display is not supported by a bracket (e.g., the bracket 730 of FIG. 7) in the second state of the electronic device. The electronic device according to an embodiment may divide the target area into a plurality of unit areas and may obtain touch information about a touch made once. The touch information may include at least one of a touch time, a total touch area, and a touch area in a unit area, which are associated with the touch made once.

In operation 1830, the electronic device according to an embodiment may calculate a weight for each unit area of the target area. The electronic device may calculate weights respectively corresponding to the plurality of unit areas of the target area based on the obtained touch information. The electronic device according to an embodiment may calculate the weights respectively corresponding to the plurality of unit areas, based on at least a portion of information according to the touch simulation determining a value of maximum stress endurable by the display for each unit area and the obtained touch information.

In operation 1840, the electronic device according to an embodiment may calculate a stress value for each unit area of the target area. The electronic device may accumulate the calculated weight to calculate a stress value. For example, the electronic device may calculate stress values respectively corresponding to the unit areas of the target area and may store the stress values in a memory (e.g., the memory 130 of FIG. 1).

In operation 1850, the electronic device according to an embodiment may determine whether a stress value corresponding to at least one unit area of the target area is greater than a third threshold value. For example, the third threshold value may be set to 90% of the maximum stress value determined by the touch simulation. The third threshold value may include values that are set to correspond to the plurality of unit areas, respectively. According to an embodiment, the third threshold value may be differently set for each unit area. For example, the third threshold value of a unit area located at the center of the target area may be set to be smaller than the third threshold value of a unit area located at a periphery of the target area, in which a support structure is relatively strong.

When it is determined that a stress value corresponding to the at least one unit area of the target area is greater than the third threshold value, in operation 1860, the electronic device may change a touch sensing parameter to increase touch sensitivity of a unit area in which a threshold value is greater than the third threshold value. For example, in the case of a capacitance-type touch input manner, with regard to a unit area in which a stress value is greater than the third threshold value, the electronic device may decrease a threshold value of an amount of change in capacitance that the electronic device recognizes a touch input as a valid touch input. For another example, the electronic device may decrease a threshold value of a touch time for identifying a touch type (e.g., long press) with regard to a unit area in which a stress value is greater than the third threshold value. For another example, the electronic device may make a touch recognition area large, with regard to a unit area in which a stress value is greater than the third threshold value. For another example, in the case where an object is a touch pen, with regard to a unit area in which a stress value is greater than the third threshold value, the electronic device may decrease a pressure threshold value that is used to recognize a touch input as a valid touch input. According to an embodiment, the electronic device may increase touch sensitivity of a unit area in which a stress value is greater than the third threshold value, such that there is reduced pressure that is applied to the unit area (or an area including the unit area) when a touch is made thereon.

When it is determined that all stress values corresponding to the unit areas of the target area are smaller than or equal to the third threshold value, the electronic device may maintain the touch sensitivity without modification.

Figure 19:
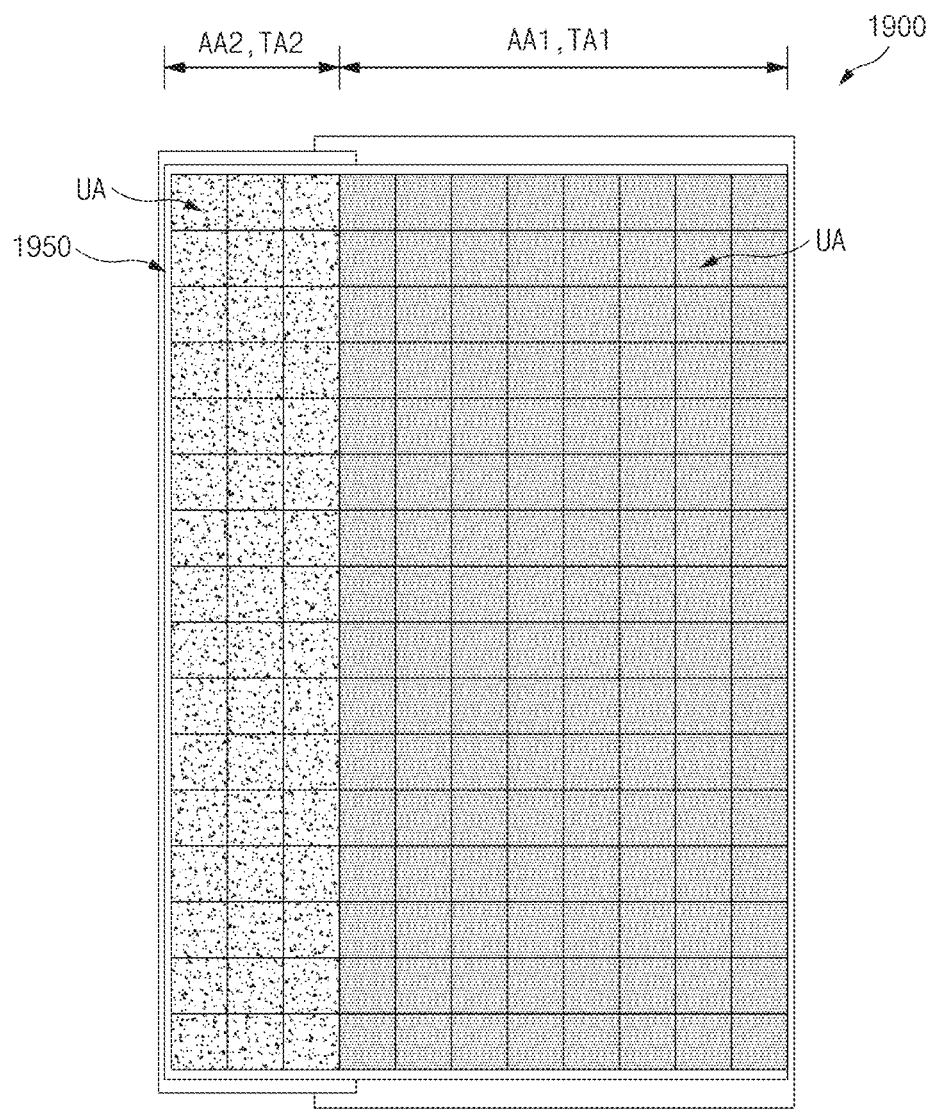
FIG. 19 is a diagram illustrating an example target area and a plurality of unit areas of an electronic device according to an embodiment.

Below, the target area TA and the plurality of unit areas UA of an electronic device 1900 according to an embodiment will be described with reference to FIG. 19. FIG. 19 is a diagram illustrating example target areas TA1 and TA2 and the plurality of unit areas UA of an electronic device according to an embodiment. FIG. 19 is a diagram illustrating the second state of the electronic device 1900 according to an embodiment.

The electronic device 1900 according to an embodiment may include a display 1950. The default area AA1 of the display 1950 may be maintained in a state of being exposed on a front surface of the electronic device 1900, in the first state and the second state, and the area of the expansion area AA2 visually exposed on the front surface of the electronic device 1900 may change depending on a state of the electronic device 1900. The electronic device 1900 may display an image through the default area AA1 and the expansion area AA2 in the second state.

In the electronic device 1900 according to an embodiment, at least portions of the display areas AA1 and AA2 of the display 1950 may be respectively designated as target areas TA1 and TA2. In the electronic device 1900 according to an embodiment, the default area AA1 may be designated as the first target area TA1, and the expansion area AA2 may be designated as the second target area TA2.

The electronic device 1900 according to an embodiment may divide the target areas TA1 and TA2 into the plurality of unit areas UA. The plurality of unit areas UA may be arranged in a lattice (or matrix) form. However, the arrangement and shape of the plurality of unit areas UA are not limited to the example illustrated in FIG. 19. The area of the plurality of unit areas UA may be determined based on a total touch area for a one-time touch of an object.

The electronic device 1900 according to an embodiment may divide the target areas TA1 and TA2 into the plurality of unit areas UA to obtain touch information (e.g., 820 of FIG. 8). The electronic device 1900 may calculate a weight corresponding to each of the plurality of unit areas UA (e.g., 830 of FIG. 8) and may calculate a stress value corresponding to each of the plurality of unit areas UA (e.g., 840 of FIG. 8). When a stress value of the unit area UA is greater than the specified threshold value, the electronic device 1900 may change a position of a graphic user interface or may change touch sensitivity.

In the electronic device 1900 according to an embodiment, a support structure associated with the default area AA1 and a support structure associated with the expansion area AA2 may be different. As such, a threshold value associated with a stress value of the unit area UA of the first target area TA1 and a threshold value associated with a stress value of the unit area UA of the second target area TA2 may be different. For example, the electronic device 1900 may determine whether a stress value of at least one unit area UA of the first target area TA1 is greater than a fourth threshold value and may determine whether a stress value of at least one unit area UA of the second target area TA2 is greater than a fifth threshold value.

Figure 20:
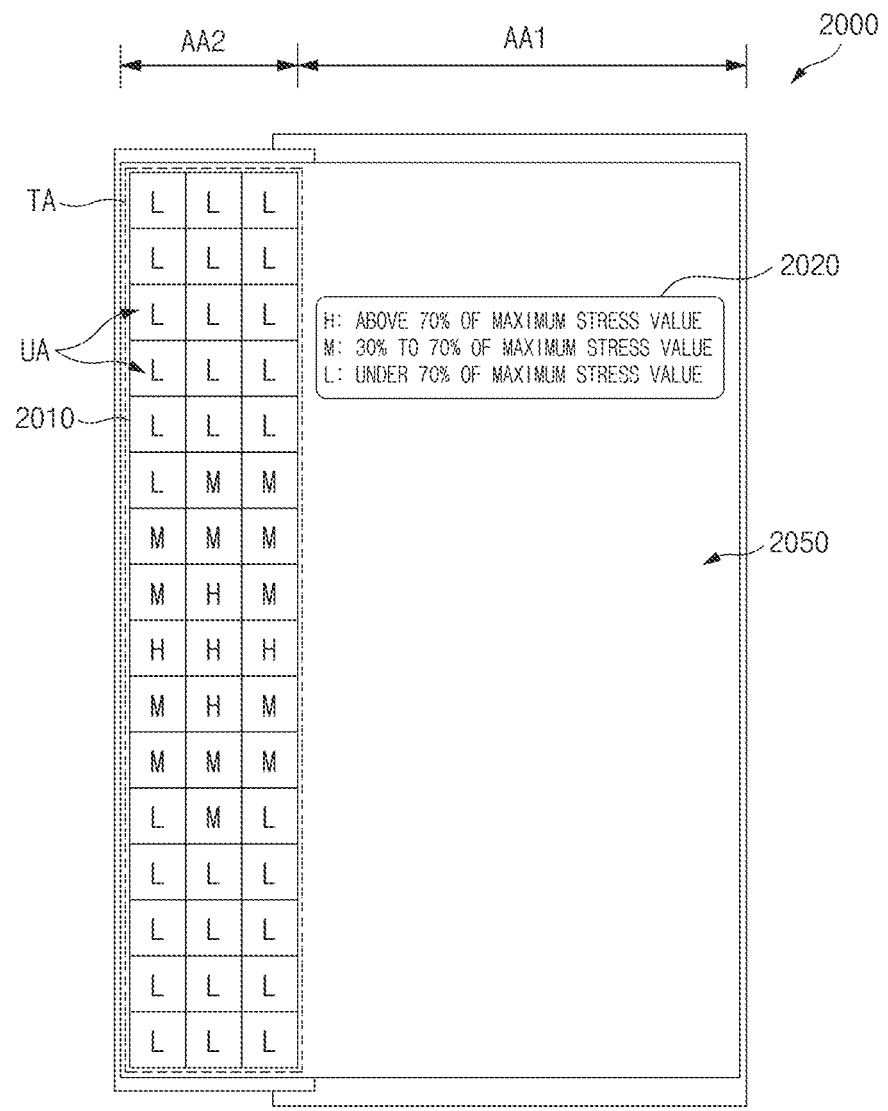
FIG. 20 is a diagram illustrating an example screen displaying information about a stress value for each unit area at an electronic device according to an embodiment.

FIG. 20 is a diagram illustrating an example screen displaying information about a stress value for each unit area at an electronic device according to an embodiment.

Referring to FIG. 20, an electronic device 2000 according to an embodiment may include a display 2050. In the electronic device 2000 according to an embodiment, at least a portion of the display areas AA1 and AA2 of the display 2050 may be designated as the target area TA. The target area TA may be divided into the plurality of unit areas UA.

The electronic device 2000 according to an embodiment may display user interfaces 2010 and 2020 indicating information about a stress value for each unit area UA on the display 2050, based on a user input for checking information about a stress value. The electronic device 2000 may display the first user interface 2010 indicating stress values respectively associated with the plurality of unit areas UA on the display 2050. The first user interface 2010 may include a visual indication (e.g., an icon, a character, a color) associated with a range in which stress values of the unit areas UA are included. For example, depending on a range in which a stress value is included, "H", "M", or "L" may be displayed in each of the unit areas UA of the target area TA. The first user interface 2010 of FIG. 20 corresponds to only one example, and the first user interface 2010 may include any visual indication showing a stress value for each unit area UA. For example, the first user interface 2010 may include a real stress value for each unit area UA.

The electronic device 2000 may display the second user interface 2020 including additional information about a stress value for each unit area on the display 2050. For example, the second user interface 2020 may include range information about a stress value associated with "H", "M", or "L" of the first user interface 2010.

The electronic device 2000 according to an embodiment may display the information 2010 and 2020 about a stress value of each unit area UA such that information about an area in which stress due to a touch is accumulated is provided to the user. According to an embodiment, the electronic device 2000 may also display a user interface, which allows the user to directly set touch sensitivity for each area, on the display 2050.

An electronic device according to an example embodiment may include a display including a target area divided into a plurality of unit areas wherein a size of an area visually exposed to the outside of the electronic device is changed, a touch circuit configured to sense a touch of an object, and a processor operatively connected with the display and the touch circuit. The processor may be configured to: control the display to display a graphic user interface in a first area belonging to the target area using the display, calculate stress values respectively corresponding to the plurality of unit areas of the target area based on the touch of the object being sensed, and change a position of the graphic user interface to a second area different from the first area based on the stress value of at least one unit area of the first area being greater than a first threshold value.

The processor may be configured to: obtain touch information about the target area, calculate weights respectively corresponding to the plurality of unit areas, based on the obtained touch information, and calculate the stress values respectively corresponding to the plurality of unit areas, based on the weights.

The touch information may include at least one of a touch time, a total touch area, and a touch area in the unit area, which are associated with the touch of the object.

The processor may be configured to designate sample areas around the first area based on the stress value of the at least one unit area of the first area being greater than the first threshold value, calculate stress average values respectively associated with the sample areas, and designate one sample area of the sample areas as the second area, based on the stress values of the plurality of unit areas and the stress average values.

Based on the stress value of at least one unit area located in a sample area, which has the smallest stress average value of the stress average values, from among the sample areas being greater than a second threshold value, the processor may be configured to designate one sample area of the remaining sample areas other than the sample area whose stress average value is the smallest, as the second area.

Based on the stress values of the plurality of unit areas located in the sample area having the smallest stress average value being smaller than or equal to the second threshold value, the processor may be configured to designate the sample area having the smallest stress average value, as the second area.

Based on the stress value of the at least one unit area of the first area belonging to a specified range, the processor may be configured to change attributes of the graphic user interface and control the display to display the graphic user interface whose attributes are changed, in the first area.

Based on the stress value of the at least one unit area of the first area being greater than the first threshold value, the processor may be configured to control the display to display the graphic user interface whose attributes are not changed, in the second area.

The processor may be configured to control the display to display a user interface indicating information about the stress values of the plurality of unit areas on the display.

The display may include a default area and an expansion area, and the display may be configured to display an image through the default area in a first state and display the image through the default area and the expansion area in a second state.

Based on the second area being located at a boundary of the default area and the expansion area, the processor may be configured to control the display to display the graphic user interface in a third area not overlapping the boundary.

The processor may be configured to change a touch sensing parameter of a unit area whose stress value is greater than a third threshold value, from among the plurality of unit areas.

An electronic device according to an example embodiment may include: a display including a target area divided into a plurality of unit areas wherein a size of an area visually exposed to the outside of the electronic device is changed, a touch circuit configured to sense a touch of an object, and a processor operatively connected with the display and the touch circuit. The processor may be configured to: calculate stress values respectively corresponding to the plurality of unit areas of the target area based on the touch of the object being sensed, and change a touch sensing parameter of a unit area whose stress value is greater than a first threshold value, from among the plurality of unit areas.

The touch sensing parameter may include at least one of a threshold value of a capacitance change magnitude for recognition of a valid touch input, a threshold value of a touch time for identification of a touch type, a touch recognition area, or a pressure threshold value for recognition for a valid touch input.

The processor may be configured to: obtain touch information about the target area, calculate weights respectively corresponding to the plurality of unit areas, based on the obtained touch information, and calculate the stress values respectively corresponding to the plurality of unit areas, based on the weights.

The display may include a default area and an expansion area, and the display may be configured to display an image through the default area in a first state and display the image through the default area and the expansion area in a second state.

The target area may include a first target area located in the default area and a second target area located in the expansion area.

The processor may be configured to control the display to display a user interface indicating information about the stress values of the plurality of unit areas on the display.

The first threshold value may include values set to correspond to the plurality of unit areas, respectively.

The processor may be configured to control the display to display a graphic user interface in a first area belonging to the target area, and change a position of the graphic user interface to a second area different from the first area based on the stress value of at least one unit area of the first area being greater than a second threshold value.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with,"

"coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
a display including an area visually exposed to an outside of the electronic device capable of being changed between a first state and a second state;
a touch circuit configured to sense a touch by an object; and
at least one processor comprising processing circuitry, operatively connected with the display and the touch circuit,
wherein the first state comprises a state in which an area of the display visually exposed to the outside of the electronic device is supported by a bracket, the second state comprises a state in which a size of the area visually exposed is larger than that of the first state, and the area of the display visually exposed in the second state includes a target area that is not supported by the bracket and is divided into a plurality of unit areas,
wherein the at least one processor is individually and/or collectively configured to:
based on sensing a touch by the object in the target area when the electronic device is in the second state, identify a stress value for each unit area of the plurality of unit areas included in the target area; and
when an identified first stress value of a first unit area among the plurality of unit areas is greater than a first threshold value, control the display to display a graphic user interface displayed in a first area including the first unit area in a second area excluding the first unit area, to reduce pressure to the first unit area,
wherein the graphic user interface includes at least one of an icon and a button capable of being touched by the object, and
wherein the first threshold value is based on a value of high stress endurable by the display to a touch pressure.

2. The electronic device of claim 1, wherein the at least one processor is configured to:
obtain touch information about the target area,
wherein calculating the stress values respectively corresponding to the plurality of unit areas includes calculating the stress values based on at least one of a touch area, a touch time, a kind of the object and the touch pressure.

3. The electronic device of claim 2, wherein the at least one processor is configured to:
based on the identified first stress value of the first unit area being greater than the first threshold value, designate sample areas around the first area;
calculate stress average values respectively associated with the sample areas; and
identify one sample area of the sample areas as the second area, based on the stress values of the plurality of unit areas and the stress average values; and
based on a second stress value of at least one unit area located in a sample area having a smallest stress average value among the sample areas being greater than a second threshold value, designate one sample area of the remaining sample areas other than the sample area as the second area.

4. The electronic device of claim 3, wherein the at least one processor is configured to:
   based on the stress values of the plurality of unit areas located in the sample area having the smallest stress average value being smaller than or equal to the second threshold value, designate the sample area having the smallest stress average value, as the second area.

5. The electronic device of claim 1, wherein a second stress value of the second unit area is smaller than the first threshold value.

6. The electronic device of claim 1, wherein the at least one processor is configured to:
   when the graphic user interface has high probability of a touch input on the graphic user interface, control the display to display the graphic user interface in the second area instead of the first area.

7. The electronic device of claim 1, wherein the at least one processor is configured to:
   based on the stress value of the first area being in a specified range, change attributes of the graphic user interface and control the display to display the graphic user interface whose attributes are changed, in the first area.

8. The electronic device of claim 7, wherein the at least one processor is configured to:
   based on the stress value of the first area being greater than the first threshold value, control the display to display the graphic user interface whose attributes are not changed, in the second area.

9. The electronic device of claim 1, wherein the at least one processor is configured to:
   control the display to display a user interface indicating information about the stress values of the plurality of unit areas on the display.

10. The electronic device of claim 1, wherein the display includes a default area and an expansion area, and
   wherein the display is configured to display an image through the default area in the first state and display the image through the default area and the expansion area in the second state.

11. The electronic device of claim 10, wherein the at least one processor is configured to:
   based on the second area being located at a boundary of the default area and the expansion area, control the display to display the graphic user interface in a third area not overlapping the boundary.

12. The electronic device of claim 1, wherein the at least one processor is configured to:
   change a touch sensing parameter of a unit area having stress value greater than a third threshold value, from among the plurality of unit areas.

13. An electronic device comprising:
   a display including a target area divided into a plurality of unit areas wherein a size of an area visually exposed to the outside of the electronic device is capable of being changed;
   a touch circuit configured to sense a touch of an object; and
   a processor, operatively connected with the display and the touch circuit, wherein the processor is configured to:
   based on the touch of the object being sensed, calculate stress values respectively corresponding to the plurality of unit areas of the target area;
   change a touch sensing parameter of a unit area having a stress value greater than a first threshold value, from among the plurality of unit areas;
   control the display to display a graphic user interface in a first area belonging to the target area; and
   based on the stress value of at least one unit area of the first area being greater than a second threshold value, change a position of the graphic user interface to a second area different from the first area.

14. A method performed by an electronic device including a display including a touch circuit configured to sense a touch by an object, wherein a size of an area visually exposed to an outside of the electronic device is capable of being changed between a first state and a second state, the first state comprises a state in which an area of the display visually exposed to the outside of the electronic device is supported by a bracket, the second state comprises a state in which the size of the area visually exposed is larger than that of the first state, and the area of the display visually exposed in the second state includes a target area that is not supported by the bracket and is divided into a plurality of unit areas, the method comprising:
   based on sensing a touch by the object in the target area when the electronic device is in the second state, identifying a stress value for each unit area of the plurality of unit areas included in the target area; and
   when an identified first stress value of a first unit area among the plurality of unit areas is greater than a first threshold value, controlling the display to display a graphic user interface displayed in a first area including the first unit area in a second area excluding the first unit area, to reduce pressure to the first unit area,
   wherein the graphic user interface includes at least one of an icon and a button capable of being touched by the object, and
   wherein the first threshold value is based on a value of stress endurable by the display to a touch pressure.

15. The method of claim 14, further comprising:
   obtaining touch information about the target area,
   wherein calculating the stress values respectively corresponding to the plurality of unit areas includes calculating the stress values based on at least one of a touch area, a touch time, a kind of the object and a touch pressure.

16. The method of claim 14, wherein a second stress value of the second unit area is smaller than the first threshold value.

17. The method of claim 14, when the graphic user interface has high probability of a touch input on the graphic user interface, controlling the display to display the graphic user interface in in the second area instead of the first area.

18. The method of claim 14, further comprising:
   based on the identified first stress value of the first unit area being greater than the first threshold value, designating sample areas around the first area;
   calculating stress average values respectively associated with the sample areas;
   identifying one sample area of the sample areas as the second area, based on the stress values of the plurality of unit areas and the stress average values; and
   based on a second stress value of at least one unit area located in a sample area having a smallest stress average value among the sample areas being greater than a second threshold value, designating one sample area of the remaining sample areas other than the sample area as the second area.

19. The method of claim 18, further comprising, based on the stress values of the plurality of unit areas located in the sample area having the smallest stress average value being smaller than or equal to the second threshold value, designating the sample area having the smallest stress average value, as the second area.

20. The method of claim 14, further comprising:
based on the stress value of the first area being in a specified range, changing attributes of the graphic user interface and control the display to display the graphic user interface whose attributes are changed, in the first area.

* * * * *